(12) United States Patent
Myoga

(10) Patent No.: US 7,418,150 B2
(45) Date of Patent: Aug. 26, 2008

(54) IMAGE PROCESSING APPARATUS, AND PROGRAM FOR PROCESSING IMAGE

(75) Inventor: Yohei Myoga, Tokyo (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 11/049,683

(22) Filed: Feb. 4, 2005

(65) Prior Publication Data
US 2005/0195317 A1 Sep. 8, 2005

(30) Foreign Application Priority Data
Feb. 10, 2004 (JP) ............................ P2004-033723

(51) Int. Cl.
G06K 9/40 (2006.01)
G06K 9/36 (2006.01)
H04N 5/222 (2006.01)

(52) U.S. Cl. .................... 382/260; 348/370; 382/284

(58) Field of Classification Search ............... 382/190, 382/232, 260, 264, 274, 282, 312, 284; 348/348, 348/364, 370, 371; 358/1.9; 396/157, 311
See application file for complete search history.

(56) References Cited

U.S. PATENT DOCUMENTS

| | | | | |
|---|---|---|---|---|
| 6,584,287 B2 * | 6/2003 | Enomoto | ............... | 396/311 |
| 6,788,892 B2 * | 9/2004 | Yano | ............... | 396/157 |
| 7,053,955 B2 * | 5/2006 | Saito et al. | ............... | 348/371 |
| 7,224,397 B2 * | 5/2007 | Sasaki | ............... | 348/348 |
| 7,242,800 B2 * | 7/2007 | Iguchi et al. | ............... | 382/167 |
| 7,245,325 B2 * | 7/2007 | Yamaguchi | ............... | 348/364 |
| 7,251,056 B2 * | 7/2007 | Matsushima | ............... | 358/1.9 |

* cited by examiner

*Primary Examiner*—Kanji Patel
(74) *Attorney, Agent, or Firm*—Oblon, Spivak, McClelland, Maier & Neustadt, P.C.

(57) ABSTRACT

An image processing apparatus is configured to include: illumination controlling section for controlling emission of light with a setting amount of light; region extracting section for independently extracting the image data of an object region indicating the object, and image data of a background region indicating background other than the object from reference image data out of two pieces of image data, respectively obtained at each change in an amount of the light from the illumination unit; filter processing section for applying a filtering process with the blurring effect to at least one piece of the image data of the object region and the background region, both extracted by the region extracting section; and combining section for generating combined image data of the reference image data with the image data subject to the filtering processing out of the image data of the object region and the background region.

12 Claims, 15 Drawing Sheets

71

72

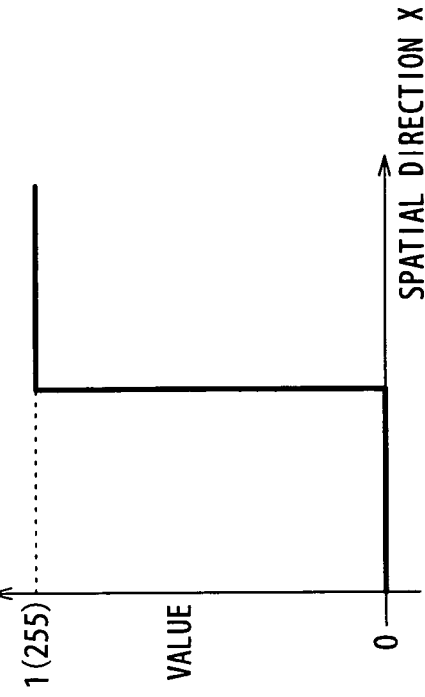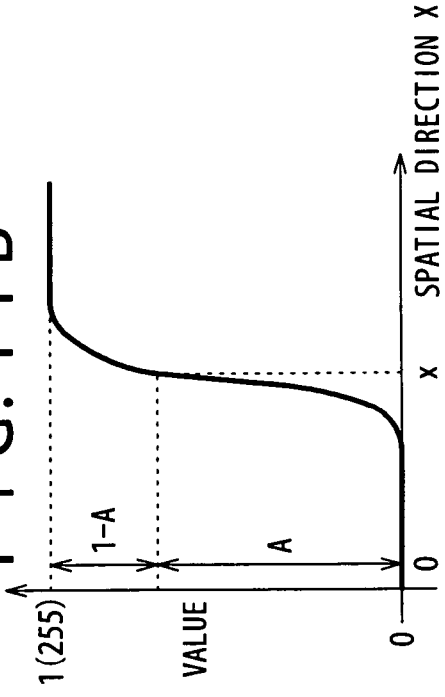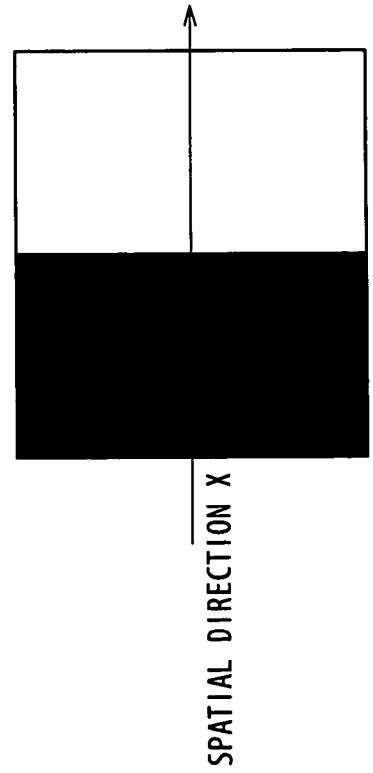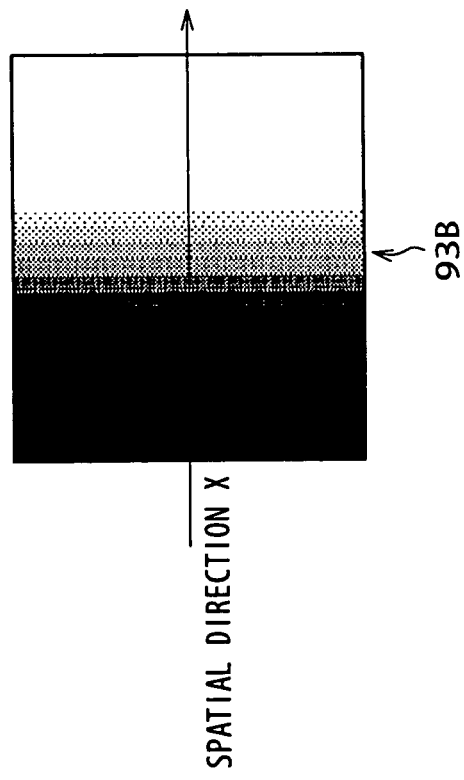

F I G. 19
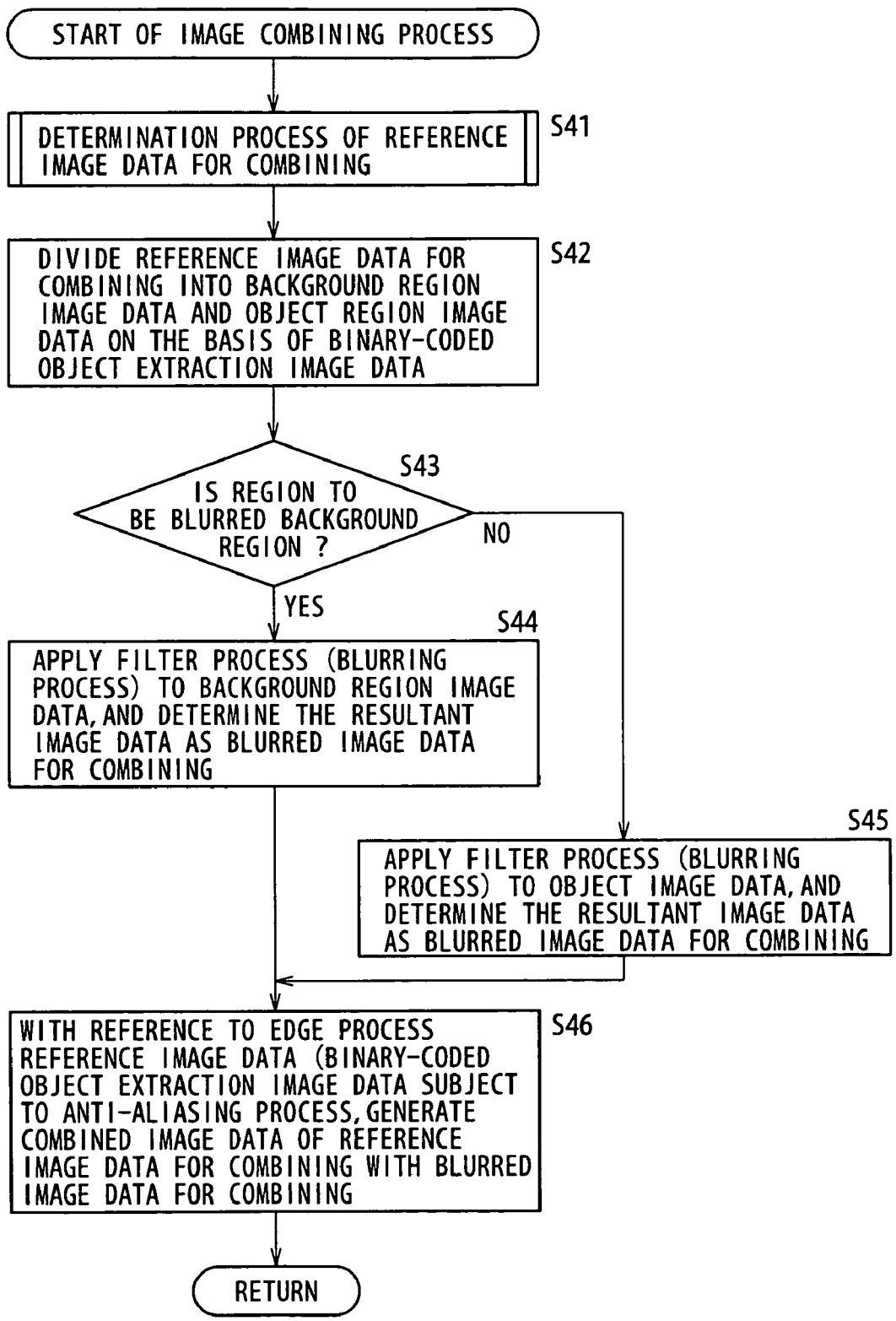

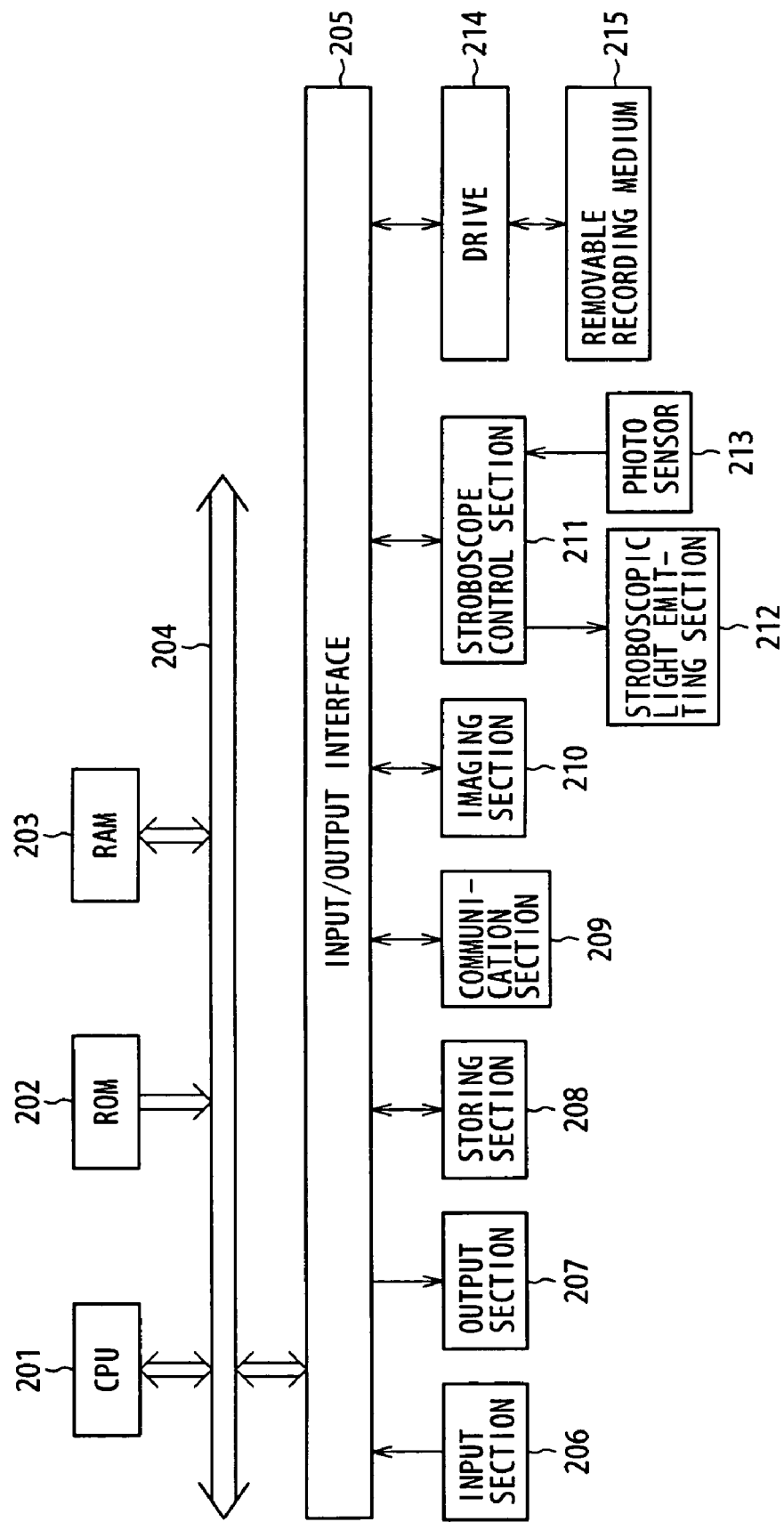

IMAGE PROCESSING APPARATUS, AND PROGRAM FOR PROCESSING IMAGE

CROSS REFERENCE TO RELATED APPLICATION

This application claims priority from Japanese Priority Document No. 2004-033723, filed on Feb. 10, 2004 with the Japanese Patent Office, which document is hereby incorporated by reference.

BACKGROUND OF THE INVENTION

1. Field of the Invention

The present invention relates to an image processing apparatus and a method and a program for processing an image, and particularly relates to an image processing apparatus and a method and a program for processing an image capable of readily providing images with a blurring effect though an imaging apparatus with a deep depth of field.

2. Description of the Related Art

Conventionally, as an imaging apparatus for shooting an object, silver-salt film cameras were popular. However, recently digital cameras rapidly become popularized (see Japanese Laid-Open Patent Nos. 2003-209727, 2002-232779, and H10-21034).

As mentioned above, the digital still camera provides an image with the same image quality as the silver-salt film camera. Thus, many users desire to obtain by digital still camera images with various effects that were inherently obtained by the silver-salt film cameras. For example, three are many requests for readily obtaining image in which the object is enhanced by blurring the background. Hereinafter, the image in which the object is enhanced by blurring the background is referred to as an image with the blurring effect.

Conventionally, to obtain such an image with the blurring effect, it was said that the following conditions (1) and (2) were necessary.

(1) The camera has a shallow depth of field (a large-diameter lens or a large lens structure).

(2) The camera user is skilled in a special shooting technique.

In the shot image includes a region where an object is clearly photographed because the image is sharply focused and another region where the image is unclearly photographed because the near and far images are out of focus. The region where the image is clearly photographed corresponds to depth of field. The depth of filed is determined by a focal length and an F value of a lens, and a distance from a camera to an object. Further, generally, when a range where an image is clearly photographed is narrow, the depth of field is expressed as a shallow depth of field, and a wide range where an image is clearly photographed is expressed as a shallow depth of field.

In other words, conventionally, when a photographer (for example, a professional cameraman or the like) meeting the condition (2) shot an image with the silver-salt film camera satisfying the condition (1), an image with the blurring effect can be obtained.

However, the above-described condition (1) is inconsistent with a digital still camera's advantageous effect of high portability by miniaturization. Furthermore, the condition (2) is inconsistent with another digital still camera's advantageous effect of easy operation in shooting. Thus, it is difficult to obtain an image with the blurring effect through a simple user operation with the digital still camera of which depth of field is deep due to possession of the advantageous effect of high portability by miniaturization. In other words, there is a problem that it is currently impossible to satisfy the demand.

Here, obtaining an image having the blurring effect with the digital camera itself is disclosed in, for example, Japanese Laid-Open Patent Application No. 2003-209727. In this Japanese Laid-Open Patent Application No. 2003-209727, focal points at respective minute regions in the image within a focal length adjustment region from near to infinite distances are detected to extract the object by regarding the minute regions showing the same focal length as the same region. Next, a suitable focal point is set on the basis of the focal length for each region to shot the image by a plurality of times. At the last, combining a plurality of images obtained from the result of shooting a plurality of times produces an image in which an amount of blurring adjusted as desired. This technique above mentioned is disclosed in the Japanese Laid-Open Patent Application No. 2003-209727.

However, the technique disclosed in the Japanese Laid-Open Patent Application divides the region using difference in high frequency components occurring on extracting the region in accordance with the focus point, which requires the above-described condition (1). In other words, the technique disclosed in the Japanese Laid-Open Patent Application No. 2003-209727 is applicable to the digital cameras having a shallow depth of field. However, it is difficult to apply the technique disclosed in the Japanese Laid-Open Patent Application No. 2003-209727 to the digital still cameras having a deep depth of field with an advantageous effect of high portability due to miniaturization, namely, to the digital still cameras used by a lot of general users who does not meet the condition (2).

Further, Japanese Laid-Open Patent Applications Nos. 2002-232779 and 10-210340 disclose only techniques distinguishing an object from the background from an image shot by a digital camera, but do not disclose and suggest the image with the blurring effect. Thus, it is difficult to solve the above-disclosed problem by the technologies disclosed in Japanese Laid-Open Patent Applications Nos. 2003-209727, 2002-232779, and 10-210340 (though these including the Japanese Laid-Open Patent Application No. 2003-209727 are combined).

This invention is provided in consideration of the above-described situation to readily provide an image with the blurring effect even if an imaging apparatus with a deep depth of field is used.

SUMMARY OF THE INVENTION

An aspect of the present invention provides an image processing apparatus for processing image data of an object shot by an imaging unit and encoded, comprising illumination controlling means for controlling emission of light to an object with a setting amount of light from the illumination unit on shooting the object by the imaging unit, region extracting means for independently extracting image data of an object region indicating the object and image data of a background region indicating a background other than the object from reference image data for reference out of two or more pieces of image data on the basis of more than one piece of image data, each shot by the imaging unit and encoded at each change in an amount of the light from the illumination unit under control by the illumination controlling means, filter processing means for applying a filtering process with the blurring effect to at least one piece of the image data of the object region and the image data of the background region, extracted by the region extracting means, and combining means for generating combined image data of the reference image data with the image data subject to the filtering processing by the filter processing means out of the image data of the object region and the image data of the background region.

The illumination control means sets either a first amount of light or a second amount of light to an amount of light of the illumination device. The image processing apparatus further comprises selection means for selecting the reference image data from first image data of the object which is shot by the imaging unit when the illumination device emits the first amount of light and second image data of the object which is shot by the imaging unit when the illumination unit emits the second amount of light. Then, the region extracting means extracts the image data of the object region and the image data of the background region from the reference image data selected by the selection means on the basis of a mutual relation between illumination of each pixel constructing the image corresponding to the first image data and illumination of each pixel constructing the image corresponding to the second image data.

The illumination control means can set an amount of light satisfying a condition that the object exists within an illumination region of the illumination unit as a first amount of light and set an amount of light which is zero as a second amount of light.

The region extracting means comprises difference value calculating means for calculating a difference value between each pair of the pixel values constructing the first image data and a pixel value of the second image data at corresponding pixel positions out of the pixel values of the first image data and the pixel values of the second image data, and separating means for separating the reference image data selected by the selection means into the image data of the object region and the image data of the background region for extraction.

The region extracting means further comprise compensation means for obtaining pixels from pixels constructing the image corresponding to the second image data which are corresponding points to at least a part of pixels constructing the image corresponding to the first image data and compensating pixel positions of the image corresponding to the first image data on the basis of each positional relation between obtained corresponding points. The difference value calculating means calculates difference values between pixel values at corresponding pixel positions out of pixel values of each pixel constructing the first image data compensated by the compensation means and pixel values of constructing the second image data, respectively.

The difference value calculating means outputs difference image data having the calculated difference value as each pixel value. The region extracting means comprising binary-coding means for binary-coding each pixel value of the difference image data outputted from the difference value calculating means and outputting the resulting first binary-coded image data, and object detecting means for detecting the object region from an image corresponding to the first binary-coded image data outputted by the binary-coding means on the basis of the difference image data outputted by the difference value calculating means and generating a second binary-coded image data having a first value for pixel values of pixels constructing the detected object region and a second value for pixel values of pixels constructing the background region other than the object region. The separating means separates the reference image data into the image data of the object region and image data of the background region for extraction on the basis of the second binary-coded image data outputted by the object region detection means.

The image processing apparatus further comprises anti-aliasing processing means for effecting anti-aliasing processing to the second binary-coded data outputted by the object detection means. The combining means determines a pixel value of each pixel at a boundary between the corresponding images of the object region and the background region and at the vicinity of the boundary in the combining image data on the basis of the second binary-coded image data subject to the anti-aliasing process by the anti-aliasing processing means.

The anti-aliasing processing means has a function supplied with pixel positions in a predetermined direction as an input variable for outputting values indicative of a mixing ratio between the object region and the background region at a pixel of pixel positions to execute an anti-aliasing processing using a function in which the output shows a change of a curve along an advance direction.

Specifying means specifies one to be used among a plurality of kinds of processes previously registered as a filter processing in filter processing means and specifies a value of parameter necessary for the specified kind of the filtering process. The filter processing means can execute a filter process specified by the specifying process means with the specified value of the parameter.

There is further provided trigger generating means for generating a trigger causing the imaging unit to shoot the object, and process control means for causing the illumination controlling means to execute its process in response to the trigger generated by the trigger generating means, obtaining more than one image of the object shot by the imaging unit every change in an amount of light of the illumination unit under controlling of the illumination control means to encode them, and causing the region extracting means, the filter processing means, and a combining means to execute their processes in this order as a sequential process.

Another aspect according to the present invention provides an image processing method of processing image data of an object shot by an imaging unit and encoded, comprising: an illumination controlling step for setting a setting amount of light from an illumination unit and controlling emission of light to an object with the setting amount of light from the illumination unit on shooting the object by the imaging unit; a region extracting step for independently extracting image data of an object region indicating the object and image data of a background region indicating a background other than the object from reference image data as reference out of more than one pieces of image data on the basis of more than one piece of image data, respectively shot by the imaging unit at each change in an amount of the light from the illumination unit under control by the illumination controlling step; a filter processing step for applying a filter processing with a blurring effect to at least one of a piece of the image data of the object region and a piece of image data of the background region, extracted by the region extracting step; and a combining step for generating combined image data of the reference image data with the image data subject to the filter process by the filter processing step out of the image data of the object region and the image data of the background region.

A further aspect according to the present invention provides a program for causing a computer to control image processing for image data of an object shot by an imaging unit and encoded, comprising: an illumination controlling step for setting a setting amount of light from an illumination unit and controlling emission of light to an object with the setting amount of light from the illumination unit on shooting the object by the imaging unit; a region extracting step for independently extracting image data of an object region indicating the object and image data of a background region indicating a background other than the object from reference image data as reference out of more than one pieces of image data on the basis of more than one piece of image data, respectively shot by the imaging unit at each change in an amount of the light from the illumination unit under control by the illumination controlling step; a filter processing step for applying a filter processing with a blurring effect to at least one of a piece of the image data of the object region and a piece of image data of the background region, extracted by the region extracting step; and a combining step for generating combined image data of the reference image data with the image data subject to the filter process by the filter processing step out of the image data of the object region and the image data of the background region.

In the image processing apparatus, the method, and the program according to the present invention, the amount of the illumination unit is controlled. More than one piece of encoded image data of the object shot at each change in the amount of light are obtained. Image data of the object region indicating the object and the image data of the background region indicating the background other than the object are independently extracted from the reference image data for the reference out of more than on pieces of image data. The filter processing with the blurring effect is applied to at least one piece of the image data of the object region and image data of the background region, extracted. Finally, the image data of the reference image data is combined with the image data subject to the filter processing out of the image data of the object region and the image data of the background region to output the resultant combined image.

A further aspect of the present invention provides image processing capable of applying the image processing to the image of the object shot by the imaging unit and encoded, and readily obtaining an image with the blurring effect also from image data of the object shot by an imaging unit having a deep depth of field.

BRIEF DESCRIPTION OF THE DRAWINGS

The object and features of the present invention will become more readily apparent from the following detailed description taken in conjunction with the accompanying drawings, and the same or corresponding elements or parts are designated with like references throughout the drawings in which:

FIG. 10 is a drawing describing an anti-aliasing process according to an embodiment of the present invention.

FIGS. 11 to 13 are drawings describing the anti-aliasing process according to the embodiment of the present invention;

FIG. 19 depicts a detailed flow chart describing an example of an image combining process in the imaging and recording process shown in FIG. 15;

FIG. 21 is a block diagram illustrating a structural example of an image processing apparatus according to anther embodiment of the present invention.

DETAILED DESCRIPTION OF THE PREFERRED EMBODIMENTS

Figure 1:
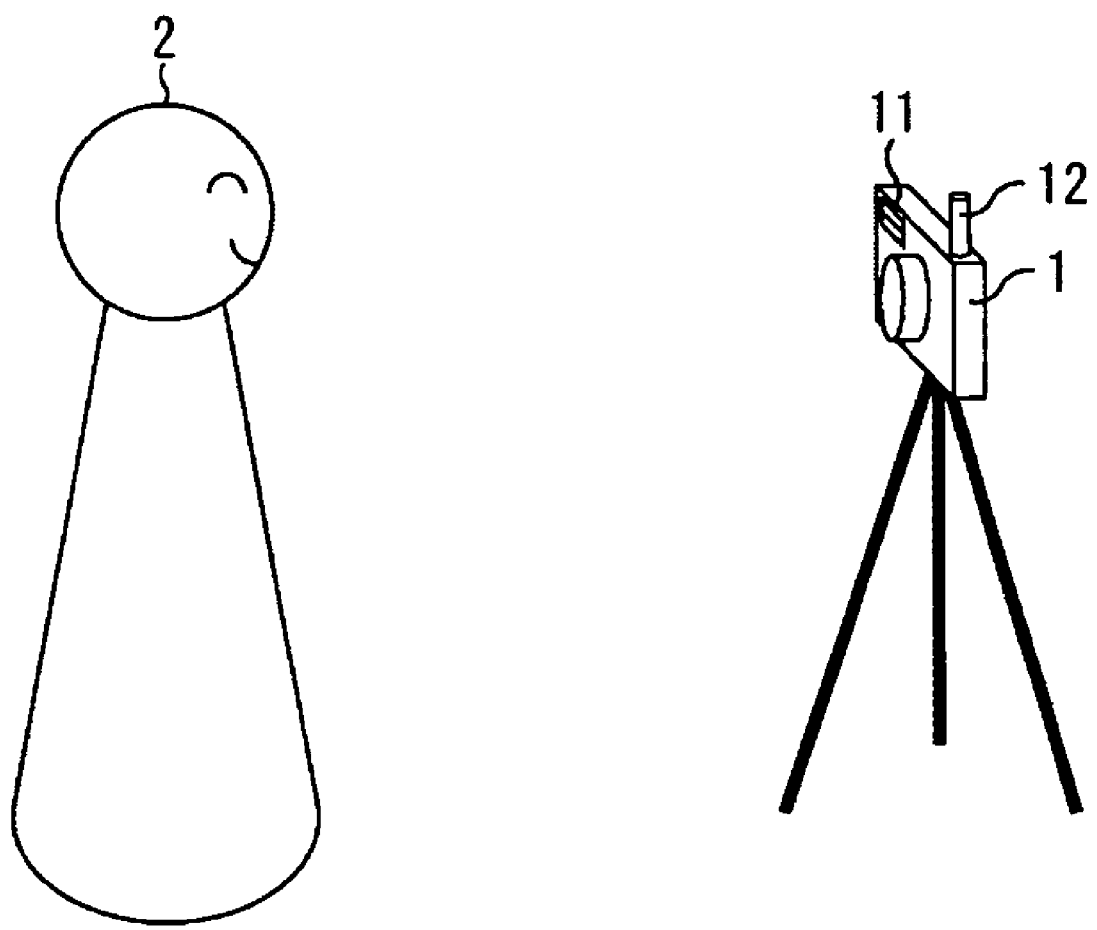
FIG. 1 is an illustration showing a configuration of a digital still camera as an image processing apparatus according to the present invention.
Figure 2:
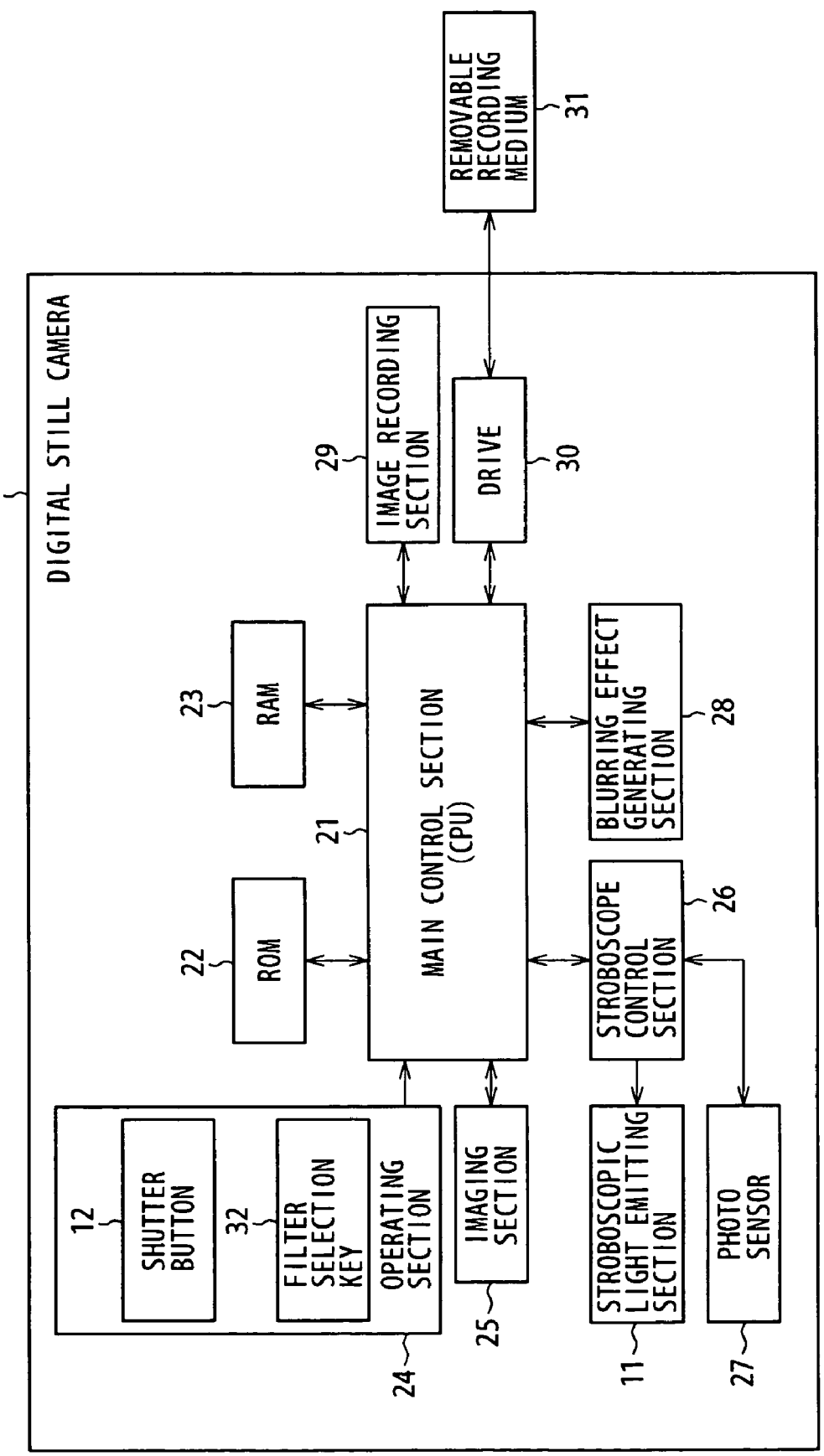
FIG. 2 is a block diagram illustrating an interior structural example of the digital still camera shown in FIG. 1.

The present invention provides an image processing apparatus. This image processing apparatus such as a digital still camera 1 shown in FIGS. 1 and 2 is used for processing image data of an object 2 in FIG. 1 shot by an imaging apparatus, for example, an imaging section 25 in FIG. 2, and digitalized. The image processing apparatus comprises: an illumination control section such as a stroboscope control section 26 which sets an amount of light of an illumination unit such as a stroboscopic light emitting section 11 in FIGS. 1 and 2 to control emitting light from the illumination unit to the object at the set amount of light upon shooting an object; a region extracting section such as a region extracting section 41 in FIG. 3 out of the blurry effect processing section 28 shown in FIGS. 2 and 3, for extracting object's region indicating an object and a background indicating a background other than the object as image data, for example, for extracting object region image 111 in FIG. 7 and a background region image data 112 in FIG. 8 as image data, from a reference image data such as the image data corresponding to the image 72 in FIG. 5, out of two or more of image data on the basis of more than one of image data such as the image data corresponding to an image 71 and an image 72 in FIG. 4.

The image processing apparatus further comprises a filter processing section for applying a filter process for the blurring effect to at least one of the image data of the object's region and image data of the background region extracted by the region extracting section, combining section for generating a combined data of the reference image data and the image data subject to the filter process by the filter processing section out of the image data of the object's region and the image data of the background region.

Figure 14:
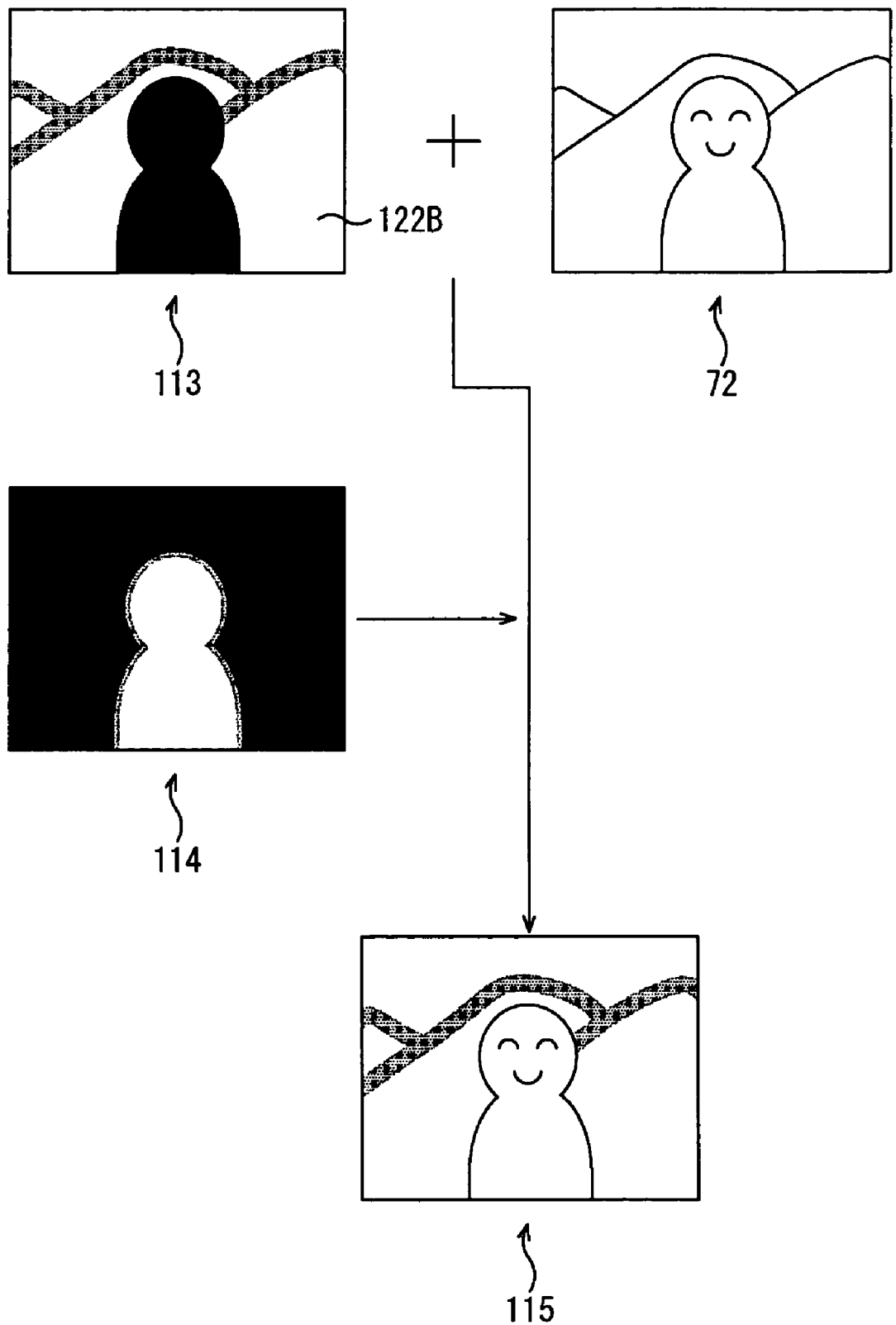
FIG. 14 is an illustration describing a process in an image combining section in the blurring effect generation processing section shown in FIG. 3.

The present invention provides an image processing apparatus. This image processing apparatus (for example, a digital still camera 1 in FIGS. 1 and 2) is such image processing apparatus for processing image data of an object (for example, an object 2 in FIG. 1) shot by an imaging unit and encoded (for example, an imaging section 25), and comprises: illumination controlling means (for example, a stroboscope control section 26 in FIG. 2) for controlling emission of light to an object with a setting amount of light from the illumination unit (for example, a stroboscopic light emitting section 11 in FIGS. 1 and 2) on shooting the object by the imaging unit; region extracting means (for example, a region extracting section 41 in FIG. 3 out of the blurry effect processing section 28 shown in FIGS. 2 and 3) for independently extracting image data of an object region indicating the object and image data of a background region indicating a background other than the object (for example, for extracting object region image 111 in FIG. 7 and a background region image data 112 in FIG. 8 as image data) from reference image data as reference (for example image data corresponding to the image 72 in FIG. 5) out of two pieces of image data on the basis of more than one piece of image data (for example, image data corresponding to an image 71 and an image 72 in FIG. 4), respectively shot by the imaging unit and encoded at each change in an amount of the light from the illumination unit under control by the illumination controlling means; filter processing means (for example, the image data corresponding to the image 113 in FIGS. 8 and 14, outputted by the filter processing section (blurring processing section) in FIG. 3 for combining) for applying a filtering process with the blurring effect to at least one piece of the image data of the object region and the image data of the background region, extracted by the region extracting means; and combining means (for example, the image combining section 45 in FIG. 3 in the blurring effect generation processing section 28 in FIGS. 2 and 3) for generating combined image data (for example, image data combined as shown in FIG. 14, i.e., the image data corresponding to combined image 115) of the reference image data with the image data (for example, the image data corresponding to the image 113 in FIGS. 9 and 14, outputted by the filter processing section (blurring processing section) 44 in FIG. 3 for combining) subject to the filtering processing by the filter processing means out of the image data of the object region and the image data of the background region.

Figure 16:
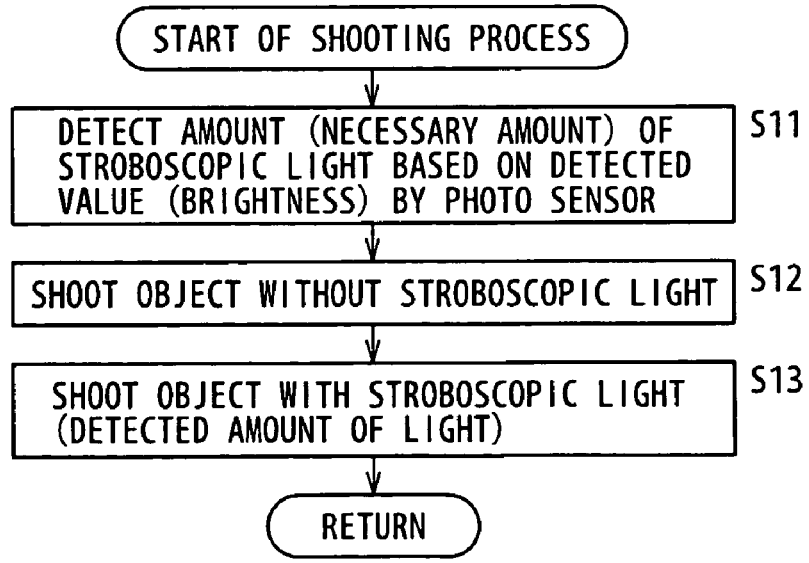
FIG. 16 depicts a detailed flow chart describing an example of an imaging process in the imaging and recording process shown in FIG. 15.

In this image processing apparatus, the illumination control section sets a first amount of light satisfying a condition that the object locates with in the illumination range of the illumination unit (for example, the setting of the first amount of light is referred to as "with stroboscopic light emission" in the specification as shown by a step S13 in FIG. 16) and sets an amount of light which is zero as a second amount of light. More specifically, as mentioned later, the term "an amount of light which is zero" defines a broad concept including a setting that the amount of the light emitted by the stroboscopic light emitting section 11 is made approximately zero (a very small amount of light is emitted) and further a setting for inhibiting the light emission operation of the stroboscopic light emitting section 11 itself.

Figure 3:
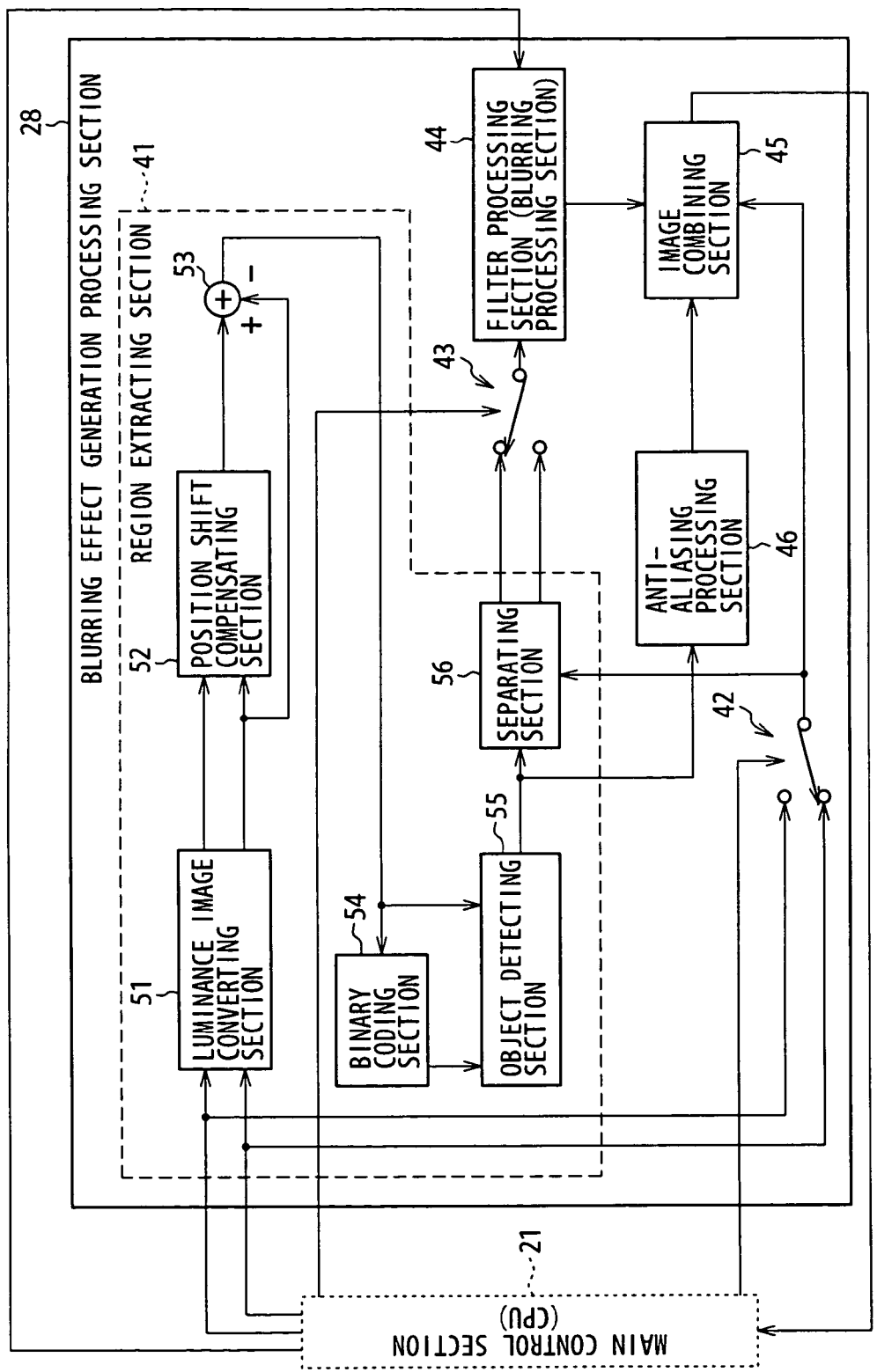
FIG. 3 is a block diagram illustrating functions of a structural example of a blurring effect generation processing section in the digital still camera shown in FIG. 2.

The region extracting section comprises a difference value calculating section (for example, an adding section (difference calculating section) 53 in FIG. 3 for calculating a difference value between each pair of pixel values of which pixel positions are corresponding out of pixel values constructing the first image data (for example, input image data without the stroboscopic light emission which is input image data without the stroboscopic light emission inputted into the blurring effect generation processing section 28 in FIG. 3 and which is converted by a luminance image converting section 51) and pixel values constructing the second image data (for example, input image data with the stroboscopic light emission which is input image data with the stroboscopic light emission inputted into the blurring effect generation processing section 28 in FIG. 3 and which is converted by a luminance image converting section 51) and a separating section (for example, a separating section 56 in FIG. 3) for separating the reference image data selected by the selecting section into the image data of the object region and the image data of the background region for extraction on the basis of the difference values calculated by the difference value calculating section.

In this image processing apparatus, the region extracting section further comprises a compensating section (for example, a position shift compensating section 52 in FIG. 3) for obtaining pixels of the second image data at corresponding points to at least a part of pixels constructing an image corresponding to the first image data and compensating pixel positions of the image corresponding to the first image data on the basis of a position relation with the obtained the corresponding points. The difference value calculating section calculates a difference value between each pair of pixel values at corresponding pixel positions out of pixels constructing the first image data (for example, in FIG. 3, the compensated luminance image data with the stroboscopic light emission outputted by the position shift compensating section 52) and pixel values located at the corresponding pixel positions constructing the second luminance image data.

In the image processing apparatus, the difference value calculating section further comprises a binary coding section (for example, a binary coding section 54 in FIG. 3) for outputting difference image data (for example, in FIG. 3, difference image data outputted from the adding section 53) having each calculated difference value as a pixel value, wherein the region extracting section binary-codes the pixel values of the difference image data outputted from the difference value calculating section, and outputting first binary-coded image data (for example, in FIG. 3, binary coding data).

In addition, the difference value calculating section further comprises an object detecting section for detecting the object region from the image corresponding to the first binary-coded image data outputted from the binary-coding section on the basis of the difference image data outputted from the difference value calculating section and generating second binary-coded image data (for example in FIG. 3, the image data which is the binary-coded object extracted image data outputted from the object detecting section 55 and which corresponds to the image 81 separated into the object region 91 and the background region 92), in which the pixel values of the pixels constructing the detected object region are made to have a first value (for example, a value indicating white) and the pixel values of the pixels constructing the detected other region, i.e., background region, are made to have a second value (for example, a value indicating shadow). The separating section separates the reference image data into the image data of the object region and the image data of the background region for extraction on the basis of the second binary-coded image data outputted by the object detecting section.

Figure 6:
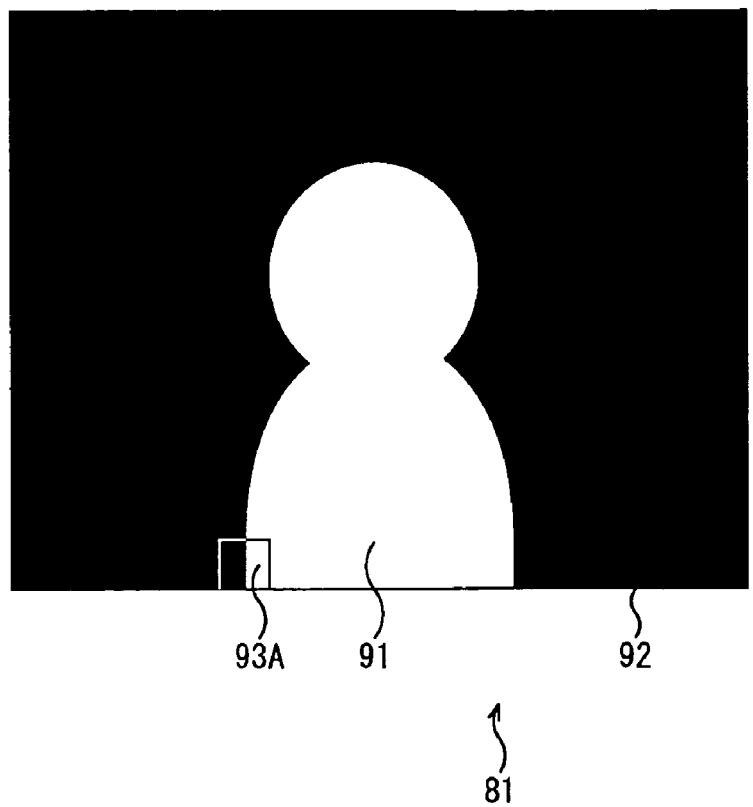
FIG. 6 illustrates an example of image corresponding to binary-coded object extracted image data outputted from the object detecting section in the blurring effect generation processing section shown in FIG. 3.

This image processing apparatus further comprises anti-aliasing section (for example the anti-aliasing processing section 46) for applying the anti-aliasing process to the second binary-coded image data outputted from the object detecting section (for example, a region 93A in FIG. 10 which is a part of a boundary portion of the binary-coded object extracted image 81 in FIG. 6 and a region 93B in FIG. 11 as the result of applying the anti-aliasing process to the region 93A in FIG. 10.) The combining section determines a pixel value of each pixel located at a boundary and its vicinity between the object region and the background region of a corresponding image out of the combined image data to be generated (for example, as shown in FIG. 11, a combining ratio at a pixel value of a pixel at a pixel position x between the object region (1) and the background region (0) is determined as A:1−A, wherein A is a positive value not greater than one) on the basis of the second binary-coded image data (for example, in the example in FIG. 3, the edge processing reference image data outputted by the anti-aliasing processing section 46) to which the anti-aliasing processing section applies the anti-aliasing process.

In this image processing apparatus, the anti-aliasing processing section is a function supplied as an input variable with a pixel position (for example, a pixel position x in FIG. 11) in a predetermined direction (for example, a spatial direction X shown in FIG. 11) for outputting a value indicating a mixing ratio (for example, A:1−A at the pixel position x in FIG. 11) between the object region and the background region at the inputted pixel position to execute the anti-aliasing process with the function of which output varies along the direction like a curve (for example, a function f(X).)

This image processing apparatus further comprises a specifying section (for example, a filter selecting key 32 in FIG. 2) for specifying one of a plurality of processes previously registered as the filter processing in the filter processing section that is to be used and specifying a value of a parameter necessary for the specified kind of filter processing. The filter processing section can execute the filter process of which kind is specified by the specifying section with the value of the parameter specified by the specifying section (for example, as shown in FIG. 3, the filter signal as a signal corresponding to the operation of the filter selection key 32 in FIG. 2 is applied from the main control section (CPU) 21 to the filter processing section (blurring processing section) 44 and the filter processing section (blurring processing section) 44 executes the filter process corresponding to the filter signal.)

Figure 15:
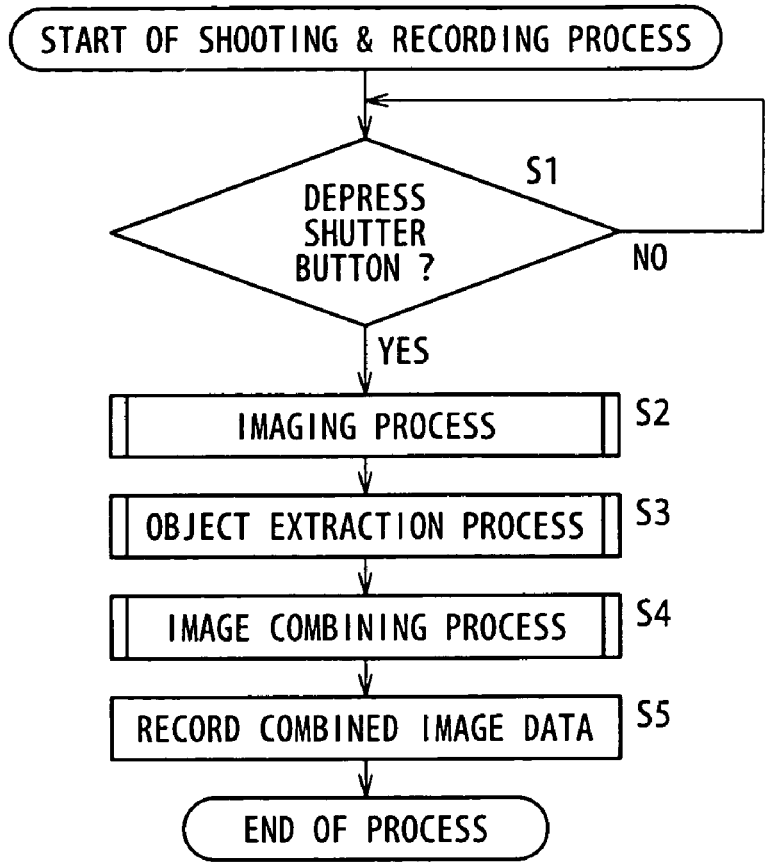
FIG. 15 depicts a flow chart describing an example of an imaging and recording process executed by the digital still camera shown in FIG. 2.

This image processing apparatus further comprises a trigger generating section (for example the shutter button 12 in FIGS. 1 and 2) for generating a trigger causing the imaging section to shoot the object and a processing control section (for example the main control section (CPU 21) in FIG. 2 controlling execution of the imaging and recording process in FIG. 15) for causing the illumination control section to execute its process, obtaining more than one piece of image of the object shot by the imaging unit at each change in an amount of light of the illumination unit under control of the illumination control section with encoding, and controlling execution of the processes of the region extracting section, the filter processing section and the combining section to more than one piece of encoded image data as a sequential process in the order.

According to the present invention, an image processing method is provided. The image processing method (for example, the image processing method corresponding to the image recording and recording process in FIG. 15) is for the image processing apparatus (for example the digital still camera 1 in FIGS. 1 and 2) processing the image data of the object shot by an imaging unit and encoded (for example, imaging section 25 in FIG. 2), and comprises: an illumination controlling step (for example, the imaging process in a step S2 in FIG. 15, more specifically, the process in FIG. 16) for setting a setting amount of light from an illumination unit (for example, the stroboscopic light emitting section 11 shown in FIGS. 1 and 2) and controlling emission of light to an object with the setting amount of light from the illumination unit on shooting the object by the imaging unit; a region extracting step (for example, the object extracting process in a step S3 in FIG. 15, more specifically, the process in FIGS. 17 and 18) for independently extracting image data of an object region indicating the object and image data of a background region indicating a background other than the object from reference image data for reference out of more than one piece of image data on the basis of more than one piece of image data, respectively shot by the imaging unit at each change in an amount of the light from the illumination unit under control by the illumination controlling step; a filter processing step (for example, a part of the image combining process in a step S4 in FIG. 15, particularly the process from the steps from S43 to S45 in FIG. 19) for applying a filtering process with a blurring effect to at least one of a piece of the image data of the object region and a piece of image data of the background region, extracted by the region extracting step; and a combining step (for example, a part of the image combining process in a step S4 in FIG. 15, particularly the process in a step S46 in FIG. 19) for generating combined image data of the reference image data with the image data subject to the filter process by the filtering processing step out of the image data of the object region and the image data of the background region.

According to the present invention, a program is provided. This program corresponds the above-described image processing method and is provided for causing a computer (for example, the main control section 21 including the CPU in FIG. 2) to control the image process in which the image data is shot with an imaging unit (for example, the imaging section 25 in FIG. 2) and encoded.

The image processing apparatus to which the present invention is applicable may have various modes. However, hereinafter, a digital still camera will be mainly described as one of various embodiments of the present invention.

FIG. 1 illustrates an example of a configuration of a digital still camera to which the present invention is applied.

As illustrated in FIG. 1, the digital still camera 1 comprises a stroboscopic light emitting section 11 for illuminating (emitting flash light to an object 2 on shooting) and a shutter bottom 12 for commanding start of shooting the object 2 (by applying a trigger signal into the digital still camera 1).

The digital still camera 1 executes following processes (a) to (d) in the present embodiment.

(a) When a user (not shown) depresses the shutter button 12, the digital still camera 1 shoots the object 2 in front of the still camera within its shooting region plurality of times in which the illumination condition of the stroboscopic light emitting section 11 is changed. As the result, a plurality of images (image signals) are encoded.

(b) The digital still camera 1 selects one of a plurality of pieces of image data as a reference image data. The digital still camera 1 divides by a digital image process, the image corresponding to the reference image data into a region indicating the object 2 (hereinafter referred to as a object region) and a region indicating a background other than the image of the object (hereinafter referred to as a background region) to extract image data, respectively. More specifically, the digital still camera 1 independently outputs the image data of the object region and the image data at the background region.

(c) The digital still camera 1 applies the blurring effect to at least one of the object region image data piece and the background image data piece (for example, the background region image data piece) by a digital filter process.

(d) The digital still camera 1 combines the reference image data with the image data to which the blurring effect is applied to generate a combined image data.

Here, the digital still camera 1 can execute the following process instead of the process (d) as other process (capable to be executed at the processing timing of the process (d)).

More specifically, for example, the digital still camera 1 executes instead of the process (d) such a process that combines the object region image data (or background image data) without the burring effect with the background imaged data (or object region data) with the blurring effect.

Further, for example, the digital still camera 1 can execute instead of the process (d) such a process as to combine the object region image data (or the background image data) to which a first blurring effect is applied by executing a first kind of digital filtering process with the background region image data (or the object region image data) to which a second blurring effect is applied by executing a second kind of digital filtering process.

In the example shown in FIG. 1, the stroboscopic light emitting section 11 is built in the digital camera 1. However, this is not an essential element for the digital still camera 1. More specifically, the present invention is applicable to a digital still camera without the built-in stroboscopic light emitting section 11, but capable of attachable to an external stroboscopic illumination apparatus.

However, the digital still camera without the built-in stroboscopic light emitting section 11 should, instead of the above-described process (a), execute the following process. This digital still camera (not shown) executes such a process as to, when a user (not shown) depress a shutter button or a button corresponding to the shutter button 12, shot the object in front thereof a plurality of times while the illumination condition of a stroboscopic illumination unit externally attachable to the digital still camera is changed every shooting and encode the resulting a plurality of images, namely image signals in this case.

As mentioned above, the digital still camera 1 according to this embodiment can execute the processes of (a) to (d). Thus, the digital still camera 1 can provides images with the blurring effect only with the digital process (shooting process) for processing the shot image without the special restrictive condition such as the conditions (1) and (2) explained in Description of the Related Art. In other words, the conventional problems can be solved.

FIG. 2 is a block diagram illustrating an example of hardware inner structure of the digital still camera 1 as an image processing apparatus to which the present invention is applied.

In the digital still camera 1 shown in FIG. 2, a main control section 21 comprises a CPU (Central Processing Unit) or the like controlling operation of the whole of the digital still camera 1 in accordance with a program stored in the ROM (Read Only Memory) 22 or the like, namely controlling respective sections (sections mentioned later) connected to the main control section 21.

For example, to the main control section 21, an operating section 24 including a plurality of buttons and keys such as the shutter button 12 (shown in FIG. 1), a filter selection key 32, and the like is connected. The main control section 21 recognizes signals applied from the operating section 24 to execute corresponding various processes. More specifically, for example, when the shutter button 12 is depressed (the corresponding signal is inputted), the main control section 21 executes various processes (including control processes) for respective sections in accordance with the flow chart (mentioned later) shown in FIG. 15.

In this case, in a RAM (Random Access Memory) 23 connected to the main control section 21, data or the like necessary for various processes done by the main control section 21 is occasionally stored.

To the main control section 21, the ROM 22, the RAM 23, the operating section 24, an imaging section 25, a stroboscope control section 26, a blurring effect generation processing section 28, an image recording section 29, and a drive 30 are connected.

The imaging section 25 comprises, for example not-shown lenses, a not-shown CCD (Charge-Coupled Device) or the like. This CCD senses an image of an object 2 (FIG. 1) formed by the lens to generate and supply an analog image signal to the main control section 21. The image signal supplied to the main control section 21 is, as mentioned later, encoded by the main control section 21 to supply the encoded data to the blurring effect generation processing section 28.

The stroboscope control section 26 controls an amount of light from the stroboscopic light emitting section 11 and its emission timing. More specifically, the stroboscope control section 26 executes control for changing the illumination condition of the stroboscopic light emitting section 11 in the above-described process (a).

More specifically, for example, in this embodiment, the stroboscope illumination control section 26 sets either of the first amount of light or the second amount of light to the amount of light from the stroboscopic light emitting section 11 on the basis of the detection result (detection signal) of the photo sensor 27.

The first and second amounts of light may have any values as long as they satisfy the following conditions.

Generally, a light reachable distance (illumination region) of the light from the stroboscopic light emitting section 11 is extremely shorter than the natural light. If the imaging section 25 shoots the object 2 in which the amount of light from the stroboscopic light emitting section 11 is changed, luminance at respective background regions at plurality of the resultant images is substantially the same (, but lower than the luminance at the object regions). More specifically, if it is assumed that the shooting region (a region of shot scene) is fixed, and all objects including the object 2 within the shooting region do not move, the luminance at the background region of the first image shot by the imaging section 25 when the stroboscopic light emitting section 11 emits light with the first amount of light is substantially the same as the luminance at the background region of the second image shot by the imaging section when the stroboscopic illuminating section 11 emits light with a second amount of light.

In other words, when a difference value in luminance between each pair of correspondingly arranged pixels in the first and second images is calculated, the difference value in luminance at the background regions becomes substantially zero (minimum value).

Thus, if the difference value in luminance at the object region is larger to same extent (for example, greater than a predetermined threshold value), the calculation of the difference value in luminance between each pair of correspondingly arranged pixels at the first and second images readily provides detection of the object region.

More specifically, if the difference value in luminance at the object region becomes grater to some extent (for example, greater than the threshold value), the digital still camera 1 (more specifically, the blurring effect generation processing section 28 mentioned later) calculates the difference value in luminance between each pair of correspondingly arranged pixels in the first and second images and separates the first image data or second image data (the image data selected as the reference image data) into the object region image data and the background region image data on the basis of the calculation results (each difference value in luminance between each pair of pixels as the above-described the process (b).

Thus, to provide the process (b), i.e., to make the difference value in luminance at the object region great to some extent (for example, greater than the threshold value), it is sufficient to suitably set the first and second amounts of light, respectively. In other words, if the condition enabling such a process, i.e., the difference value in luminance at the object region becomes great to some extent (for example, greater than the threshold value) is satisfied, the first and second amounts of light may be determined by respective users.

However, in this embodiment, the first amount of light is set to such an amount of light as to satisfy a condition that the object locates at least within the illumination region of the stroboscopic section 11, and the second amount of light is set to an amount of light that is zero. The setting of the amount of light which is zero is a broad concept indicating not only that the amount of the emitted light from the stroboscopic illuminating section 11 is made substantially zero (an extremely small amount of light is emitted), but also that the light emitting operation of the stroboscopic illuminating section 11 is inhibited.

Under the control by such a stroboscope control section 26, an image is shot under a shooting condition that the stroboscopic light emitting section 11 emits the first amount of light and encoded as the first image data by the main control section 21, and the image is shot under another shooting condition that the stroboscopic light emitting section 11 emits light with the second amount of light (here, amount of zero) and encoded as the second image data (under the condition of only natural light without emission by the stroboscopic light emitting section 11). The first and second image data is supplied to the blurring effect generation processing section 28.

Then, the blurring effect generation processing section 28 executes the above-described process (b) with the first and second image data. More specifically, the blurring effect generation processing section 28 calculates a difference value between each pair of corresponding pixels of the first and second images and separates the reference image data (either of the first or second image data) into the object region image data and the background image data on the basis of the calculation result (a difference value in luminance between each pair of pixels).

Further, the blurring generation processing section 28 executes the above-described processes (c) and (d). More specifically the blurring generation processing section 28 applies the blurring effect to at least one piece of the object region image data and the background image data (for example, the background image data) by a digital filter process. Then, the blurring effect generation processing section 28 combines the reference data with the image data to which the blurring effect is applied to supply the resultant combined image data to the main control section 21.

Here, the blurring effect generation processing section 28 is provided, in the example shown in FIG. 2, as hardware. However, the blurring effect generation processing section 28 is provided for executing the digital image processing such as the processes (b) to (d). Thus, the blurring effect generation processing section 28 may be provided as software (or combination of hardware and software).

An example of functional structure for this blurring effect generation processing section 28 is shown in FIG. 3, in which a detailed description about the structure and the process in detail will be described later.

The image data of the object 2, which is shot by the imaging section 25, encoded by the main control section 21, and subjected to the image processing by the blurring effect generation processing section 28, i.e., the image data (combined image data) with the blurring effect obtained by the processes (a) to (d), is supplied to the main control section 21. Then, the main control section 21 compresses (encodes) the supplied image data by a predetermined compressing method such as JPEG (Joint Photographic Experts Group) to record it into an image recording section 29.

More specifically, the image recording section 29 mainly records more than one piece of such image data. The image recording section 29 can also record a computer program supplied from the removable recording medium 31.

More specifically, a removable recording medium 31 on which a computer program is recorded at need may be loaded in the drive 30 connected to the main control section 21. In such a case, the main control section 21 reads out the program recorded on the removable recording medium 31 at need through the drive 30 and installs the program on the image recording section 29 or the RAM 23 and the like.

Further, if the removable recording medium 31 capable of recording image data is loaded in the drive 30, the main control section 21 can read out the image data recorded in the image recording section 29 and write (record) the read image data into the removable recording medium 31 through the drive 30. Further, the main control section 21 can directly write the image data on the removable recording medium 31 through the drive 30 without recording the image data in the image data recording section 29.

Further, if the removable recording medium 31 on which the image data is recorded is loaded in the drive 30, the main control section 21 reads out the image data recorded on the removable recording medium 31, applies a predetermined image process to the image data, or records the image data on the image recording section 29.

The blurring effect generation processing section 28 will be described in detail with reference to FIG. 3.

As mentioned above, the blurring effect generation processing section 28 may be provided as hardware, software, or combination of them. Thus, respective parts (the region extracting section 41 to the image combining section 45, and the luminance image converting section 51 to the separating section 56 in the region extracting section 41) in the blurring effect generation processing section 28 can be provided as hardware, software, or combination thereof.

As shown in FIG. 3, the blurring effect generation processing section 28 is supplied with the input image data with the stroboscopic light emission and the input image data without the stroboscopic light emission independently from the main control section 21 independently.

Figure 4:
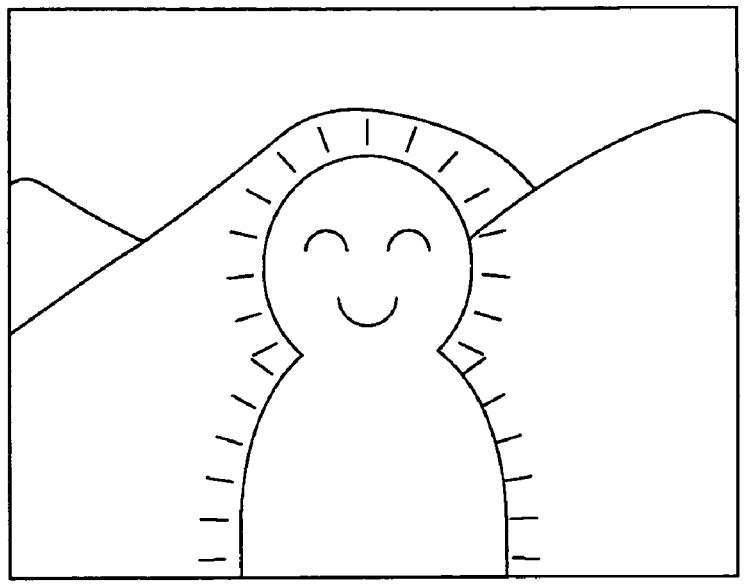
FIG. 4 is an illustration showing an example of image shot by the digital camera with stroboscopic light emission.

Here, "the input image data with the stroboscopic light emission" means the image data shot by the imaging section 25 while the stroboscopic light emitting section 11 emits light with the first amount of light and encoded by the main control section 21 (the first image data mentioned above.) More specifically, for example, input image data corresponding to an image 71 shown in FIG. 4 is applied as the input image data with the stroboscopic light emission to the blurring effect generation processing section 28.

Figure 5:
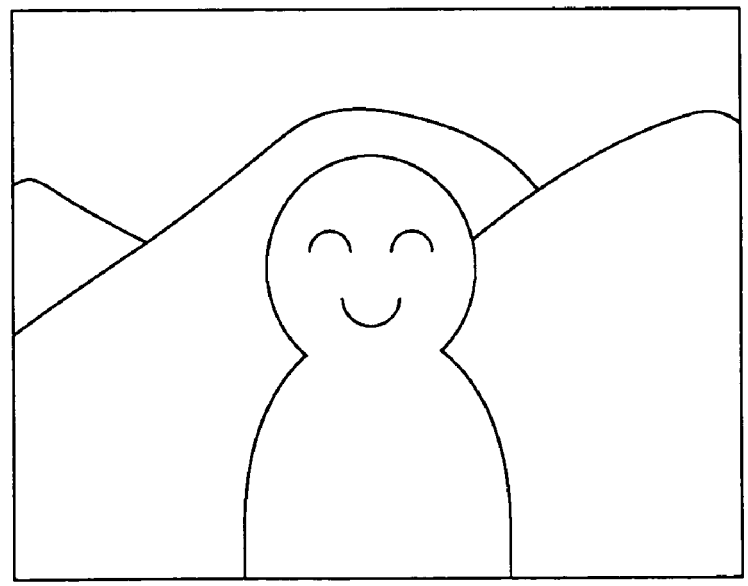
FIG. 5 is an illustration showing an example of image shot by the digital camera without the stroboscopic light emission.

On the other hand, "input image data without the stroboscopic light emission" means the image data shot by the imaging section 25 while the stroboscopic light emitting section 11 emits light with the second amount of light (in this embodiment, emits an amount of light which is zero, i.e., emits no stroboscopic light but with natural light) and encoded by the main control section 21 (the second image data mentioned above). More specifically, for example, as the input image data with the stroboscopic light, the image data corresponding to the image 72 shown in FIG. 5 is applied to the blurring effect generation processing section 28.

More specifically, the input image data with the stroboscopic light emission and the input image data without the stroboscopic light emission are independently applied to the region extracting section 41 and the selecting section 42, respectively.

Then, the region extracting section 41 independently extracts the object region and the background region from the reference image data (the image data selected by the selecting section 42 mentioned later) which serves as a reference, on the basis of the input image data with the stroboscopic light emission and the input image data without the stroboscopic light emission. More specifically, the region extracting section 41 executes the process (b) mentioned above to independently supply the resultant background region image data and the object region image data to the selecting section 43.

More specifically, the region extracting section 41 comprises a luminance image converting section 51, a position shift compensating section 52, an adding section (difference value calculating section) 53, a binary-coding section 54, an object detecting section 55, and a separating section 56.

The luminance image converting section 41 converts the input image data with the stroboscopic light emission into a luminance image data with the stroboscopic light emission to output it and converts the input image data without the stroboscopic light emission into luminance image data without the stroboscopic light emission to output it.

Here, the luminance image data mentioned herein indicates so-called black and white image data.

Thus, for example, if the input image data is so-called color image data including three pixel intensity values of RGB as respective pixel values, the luminance image converting section 51 converts the input image data into luminance image data using the following equation (1).

$$Y = 0.3IR + 0.59IG + 0.11IB \quad (1)$$

In equation (1), "Y" in the left side indicates a pixel value (luminance value) of the luminance image data.

More specifically, in this case, the luminance image data indicates image data having a luminance value Y that is the calculation result of Equation (1) as each pixel value.

Further, for example, if the input image data is so-called color image data in which image data has three values, such as a luminance value Y, a color difference value Cr, and a color difference value Cb, the luminance image converting section 51 converts the input image data into the luminance image data by canceling the color difference value Cr and the color difference value Cb out of the pixel values constructing the input image data (three values). More specifically, in this case, the luminance image data indicates image data in which only luminance value Y is left as each pixel value.

As mentioned above, the luminance image data with the stroboscopic light outputted from the illumination image converting section 51 is applied into a position shift compensating section 52. On the other hand, the luminance image data without the stroboscopic light emission is applied to the position shift compensating section 52 and to an adding section (difference value calculating section) 53.

As mentioned above, the reason why the luminance image data with the stroboscopic light emission and the luminance image data without the stroboscopic light emission is not directly applied to the adding section (difference value calculating section) 53 but once applied to the position shift compensating section 52 is, i.e., the reason why the position shift compensating section 52 is provided in this embodiment is, as follows:

Calculation of the difference value in pixel value, i.e., luminance values between a pair of pixels of which positions correspond to each other in the luminance image data with the stroboscopic light emission and the luminance image data without the stroboscopic light emission, enables readily detection of the object region.

Here, a precondition is assumed that the arrangement position of the object 2 (and the background) in the image corresponding to the luminance image data with the stroboscopic light emission agrees with that of the object (and the background) in the image corresponding to the luminance image data without the stroboscopic light emission. In other words, the precondition is that an arrangement position (pixel position) of each pixel of an image corresponding to the luminance image data with the stroboscopic light emission agrees with an arrangement position (pixel position) of a pixel at the corresponding point output the pixels of the image corresponding to the luminance image data without the stroboscopic light emission.

Here, the corresponding point means the following pixel (point). A first pixel (first point) indicative of a part of an actual object (the object 2 or the like) among the pixels (points) constructing the first image and a second pixel (second point) indicating the same part of the actual object among pixels constructing the second image are corresponding points (to the other point).

To establish the precondition, strictly speaking, it is necessary that the shooting region should be fixed, and all objects within the shooting region including the object 2 should not move.

However, in actual, shooting timings of the input image data with the stroboscopic light emission and the input image data without the stroboscopic light emission are slightly different from each other. More specifically, in this embodiment, as shown by the steps S12 and S13 in FIG. 16, first, the object 2 is shot without the stroboscopic light emission (the stroboscopic light emitting section 11 emits light with the second amount of stroboscopic light which is zero, i.e., with natural light without the stroboscopic light emission), to provide the input image data without the stroboscopic light emission. Next, the object 2 is shot with the stroboscopic light (the stroboscopic light emitting section 11 emits the first amount of light) to provide the input image data with the stroboscopic light emission. Thus, there is possibility that at least a portion of the objects within the shooting region moves.

Further, if a user shoots the object with the digital still camera 1 held by the hand, there is possibility that the shooting region of the input image data with the stroboscopic light emission is slightly shifted from the shooting region (the region of the shot scene) of inputting data without the stroboscopic light emission by vibration due to hand-holding.

Actually, arrangement positions of the object 2 (and the background) on the images in the luminance image data with the stroboscopic light emission and the illumination image data without the stroboscopic light emission are different from each other, i.e., one point may shift from the corresponding point due to different shooting timings or vibration in hand-holding.

Then, as shown in FIG. 3, to correct (compensate) the position shift, a position shift compensating section 52 is provided in this embodiment.

To compensate the position shift between corresponding points, the position shift compensating section 52 first obtains, with respect to at least a part of pixels constructing the image corresponding to the luminance image data with the stroboscopic light emission, pixels at points corresponding (corresponding point) to the pixels constructing the image corresponding to the luminance image data without the stroboscopic light emission.

Here, a method of obtaining the corresponding point is not limited to this, and various methods are applicable.

For example, as a typical method of obtaining such a corresponding point, a Window Matching Method is known which is applicable to the position shift compensating section 52.

More specifically, the position shift compensating section 52 utilizing the Window Matching Method first cuts off, for example, a predetermined region (window) centering a target pixel to be processed (hereinafter, referred to as a target pixel) from the image corresponding to the luminance image data with the stroboscopic light emission (hereinafter referred to as a first illumination image).

Next, the position shift compensating section 52 arranges the window on the image corresponding to the luminance image data with the stroboscopic light emission (hereinafter referred to as a second luminance image) and successively shifts the window in a predetermined direction. During this, the position shift compensating section 52 successively calculates, at each position of the shifted window on the second luminance image, a degree of conformity (correlation) between the window and a region (hereinafter referred to as a comparing region) of the second luminance image with which the window overlaps.

After that, the position shift compensating section 52 detects a center point (center pixel) of a comparing region showing a highest correlation out of the comparing regions within the second luminance image as a corresponding point (corresponding pixel) to the target pixel within the first luminance image.

Here, the method of calculating the degree of conformation (correlation value) is not specifically limited. For example, a normalized correlation function, an estimation function called SSD (Sum of Squared Difference), and an estimation function called SAD (Sum of Absolute Difference) are applicable.

When having obtained the corresponding point (corresponding pixel) on the second luminance image corresponding to the target pixel on the first luminance image, as mentioned above, the position shift compensating section 52 obtains and holds an amount of shift (vector) in arrangement position between the target pixel and the corresponding point.

Next, the position shift compensating section 52 successively sets each pixel constructing the first luminance image as the target pixel and repeats the successive processes mentioned above. More specifically, a corresponding point (corresponding pixel) on the second luminance image corresponding to each pixel of the first luminance image successively set as the target pixel is obtained, and the amount of shift (vector) between each target pixel and the corresponding point is obtained and held.

The number of pixels of which corresponding points are obtained (target pixels) out of the pixels constructing the first luminance image is not limited, but a given number.

For example, corresponding points for all pixels constructing the first luminance image may be obtained or only corresponding points for predetermined representative pixels may be obtained.

Further, in the case of the latter, its method of setting the representative pixels is not limited, and various methods are applicable thereto. More specifically, for example, it is possible to simply set a pixel at a predetermined arrangement position as a representative pixel. Finally, since it is aimed to detect the object region (or the background region), a pixel that is predicted to indicate the object 2 (for example, a pixel showing a pixel value (luminance value) is higher than a predetermined threshold value) can be set as the representative pixel. Further, it is also possible that, for example, first, corresponding points corresponding to a limited number of pixels are obtained and if the differences between the target points and the corresponding points obtained, respectively, are largely different (dispersed), a larger numbers of pixels are set as representative pixels to obtain the corresponding points.

When the position shift compensating section 52 accumulates amounts of shift (vectors) between more than one pixel of the first luminance image and the corresponding points of the second luminance image, on the basis of more than one stored vectors (amounts of shift), pixel positions of the first luminance image (image corresponding to the luminance image data with the stroboscopic light emission) are compensated, and the resultant image data (hereinafter referred to as compensated luminance image data with the stroboscopic light emission) is supplied to the adding section (difference value calculating section) 53.

Here, the method of compensation is not limited, and various methods are applicable. For example, a method to obtain a representative vector (an amount of shift) by averaging or gathering statistics of held vectors (amounts of shifting) and to shift arrangement positions of all pixels of the first luminance image by the amount of the vector of the representative vector ca be applicable.

The adding section (difference value calculating section) 53 is supplied with the compensation luminance image data with the stroboscopic light emission outputted by the position shift compensating section 52, and the luminance image data without the stroboscopic light emission is applied to an inversion input thereof outputted by the luminance image converting section 51 as mentioned above.

Here, "inversion input" means that polarities of the pixel values (positive values) constructing the luminance image data without the stroboscopic light emission are inverted (negative polarities).

The adding section (difference value calculating section) 53 calculates a difference value (addition with one input inverted) between each pixel value constructing the inputted compensation luminance image data with the stroboscopic light emission (the above described luminance value Y) and each pixel value located at a corresponding pixel position out of the pixel values (luminance value Y) constructing the luminance image data without the stroboscopic light emission.

The adding section (difference value calculating section) 53 generates image data having the calculated difference values as pixel values (hereinafter referred to as difference image data) to supply it to the binary-coding section 54 and the object detecting section 55.

The binary-coding section 54 binary-codes the supplied pixel values (the difference value of the luminance values) of the supplied difference image data to provide he resultant image data (hereinafter referred to as binary-coded image data) to the object detecting section 55.

More specifically, the binary-coding section 54 compares each pixel value of the difference image data (each difference value of the luminance values) with a predetermined threshold value to convert it into a first value (for example, indicating white or being 255 in the case of 256 gradations (eight bits) when it is greater than the threshold value and into a second value (for example, indicating shadow and being 0 in the case of 256 gradations (eight bits) when it is not greater than the threshold value) and supplies the resultant binary-coded image data to the object detecting section 55.

The object detecting section 55 detects, on the basis of the difference image data outputted by the adding section (difference value calculating section) 53, the object region from the image corresponding to the binary-coded image data outputted by the binary-coding section 54 to provide image data having the first value at the pixels constructing the detected object region and the second value at pixels constructing other background region (hereinafter referred to as binary-coded object extracted image data) to the separating section 56 and an anti-aliasing section 46.

More specifically, for example, as the binary-coded object extraction data, image data corresponding to an image 81 separated into the object region 91 and the background region 92 as shown in FIG. 6 is outputted and supplied from the object detection section 55 to the separating section 56 and the anti-aliasing processing section 46.

The separating section 56 separates the reference image data (either of input image data with the stroboscopic light emission or the input image data without the stroboscopic light emission selected by the selecting section 42), on the basis of the binary-coded object extracted image data output by the object detecting section 55, into the object region image data and the background region image data, and extracts independently them to supply the results to the selecting section 43.

More specifically, for example, it is assumed that as the reference data in the selecting section 42, the input image data without the stroboscopic light emission corresponding to the image 72 is selected.

Figure 7:
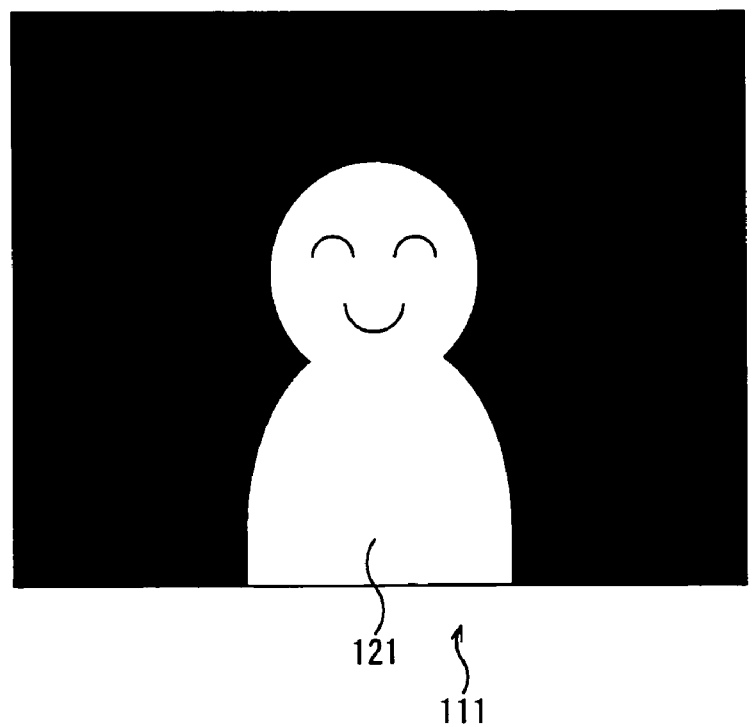
FIG. 7 illustrates an example of image corresponding to binary-coded object extracted image data outputted from the separating section in the blurring effect generation processing section shown in FIG. 3.

In this case, the separating section 56 separates and extracts a region corresponding to the object region 91 shown in FIG. 6 from the image 72 shown in FIG. 5. In other words, the separating section 56 outputs pixel values corresponding to the object region 91 shown in FIG. 6 out of the pixels constructing the reference image data corresponding to the image 72 show in FIG. 5 as they are and converts all other pixel values (the pixel values corresponding to the background region 92 shown in FIG. 6) into the same value (for example, a value indicating black) to output and supply the resultant image data as object region image data to the selecting section 43. More specifically, as the object region image data, the image corresponding to the image 111 including the object region 121 shown in FIG. 7 is supplied to the selecting section 43 from the separating section 56.

Further, the separating section 56 separates the image 72 shown in FIG. 5 to extract a region corresponding to the background region 92 shown in FIG. 6. In other words, the separating section 56 outputs the pixel values corresponding to the background region 92 shown in FIG. 6 out of the pixel values constructing the reference image data corresponding to the image 72 shown in FIG. 5 and converts all other pixel values (pixel values corresponding to the object region 91 shown in FIG. 6) into the same value (for example, a value indicating black) and supplies the resultant image data as the background region image data to the selecting section 43. More specifically, as the background image data, the separating section 56 outputs and supplies the image data corresponding to the image 112 including the background region 122A shown in FIG. 8 to the selecting section 43.

As mentioned above, a structural example of the region extracting section 41 has been described. The selecting section 42, the selecting section 43, the filter processing section 44, and the image combining section 45 will be described.

The selecting section 42 selects and supplies one from the input image data with the stroboscopic light emission and the input image data without the stroboscopic light emission as the reference image data for combining to the separating section 56 and the image combining section 45.

Here, an instruction provided from the main control section 21 to the selecting section 42 is referred to as a combining reference image selection instruction.

Though the combining reference image selection instruction is not limited to a specific mode, in the present embodiment, the signal is as follows: As described later, the stroboscope control section 26 shown in FIG. 2 judges, on the basis of the detection result (brightness of the shooting region) of the photo sensor 27 shown in FIG. 2, whether the stroboscopic light emission from the stroboscopic light emitting section 11 is necessary or not with assumption that usual shooting is going to be carried out to provide a signal (the stroboscopic light necessity signal) indicating the judging result, i.e., either a signal indicating that the stroboscopic light emission is necessary (for example, either of a high logic level or a low logic level) or a signal indicating that the stroboscopic light emission is unnecessary, (either of a high logic level or a low logic level) to the main control section 21. Then, the main control section 21 applies the stroboscopic light necessity signal to the selecting section 42 as the combining reference image selection instruction.

More specifically, when the stroboscopic light necessity signal indicating the necessity of the stroboscopic light emission is applied the selecting section 42 from the main control section 21 as the combining reference image selection instruction, the selecting section 42 selects the input image data with the stroboscopic light emission as the reference image data to supply it to the separating section 56 and the image combining section 45.

When the stroboscopic light necessity signal indicating the unnecessity of the stroboscopic light emission is applied to the selecting section 42 from the main control section 21, the selecting section 42 selects the input image data without the stroboscopic light emission as the reference image data to supply it to the separating section 56 and the image combining section 45.

The selecting section 43 selects, on the basis the instruction from the main control section 21, either of the background region image data or the object region image data, independently outputted by the separating section 56 as a target data to be subject to a filter process (blurring process) for providing the blurring effect and supplies it to the filter processing section (blurring processing section) 44.

Here, the instruction supplied from the main control section 21 to the selecting section 43 is referred to as to be blurred image selection instruction for combining.

Though the blurred image selection instruction is not limited to a specific model, in the present embodiment, the signal is as follows:

Since in the general use (user's request), it is frequent to generate an image in which the object is clearly shot, but the background is blurred, when a logic low level (or no signal) is supplied from the main control section 21, the selecting section 43 regards it as a selection instruction for the background region image data to select the background image data as the target data which is supplied to the filter processing section (blurring processing section) 44. On the other hand, when a high logic level is supplied from the main control section 21, the selecting section 43 regards it as the selection instruction for the object region image data to select the object image data as the target data that is supplied to the filter processing section (blurring processing section) 44.

Hereinafter, for convenience of explanation it is assumed that the selecting section 43 selects the background data to supply it to the filter processing section (blurring processing section) 44.

The filter processing section (blurring processing section) 44 applies a filter process providing the blurring effect to the background region image data supplied from the separating section 56 via the selecting section 43 and supplies the resultant image data (hereinafter referred to as blurred image for combining) to the combining section 45. Then, the filter processing section (blurring processing section) 44 executes the process (c) mentioned above.

Figure 8:
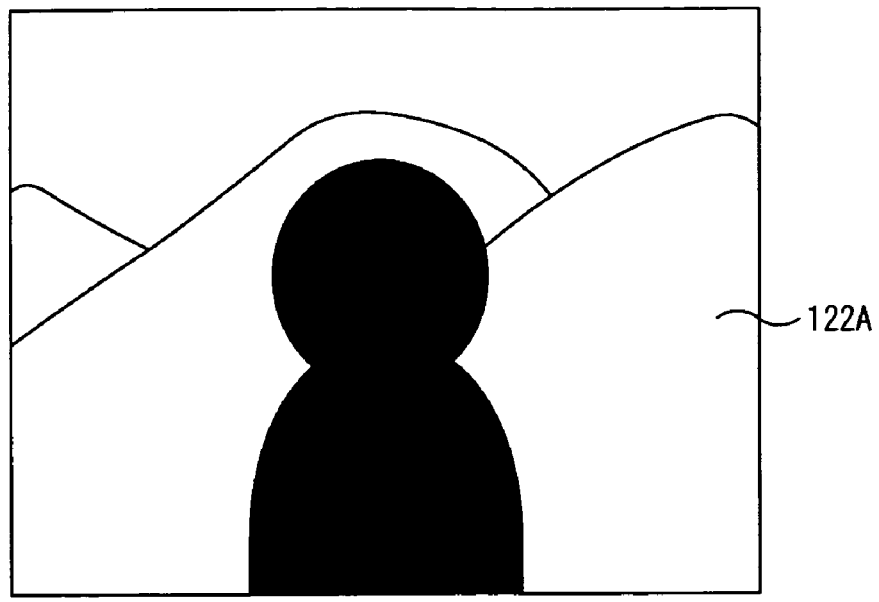
FIG. 8 illustrates an example of image corresponding to background image data outputted from the separating section in the blurring effect generation processing section shown in FIG. 3.
Figure 9:
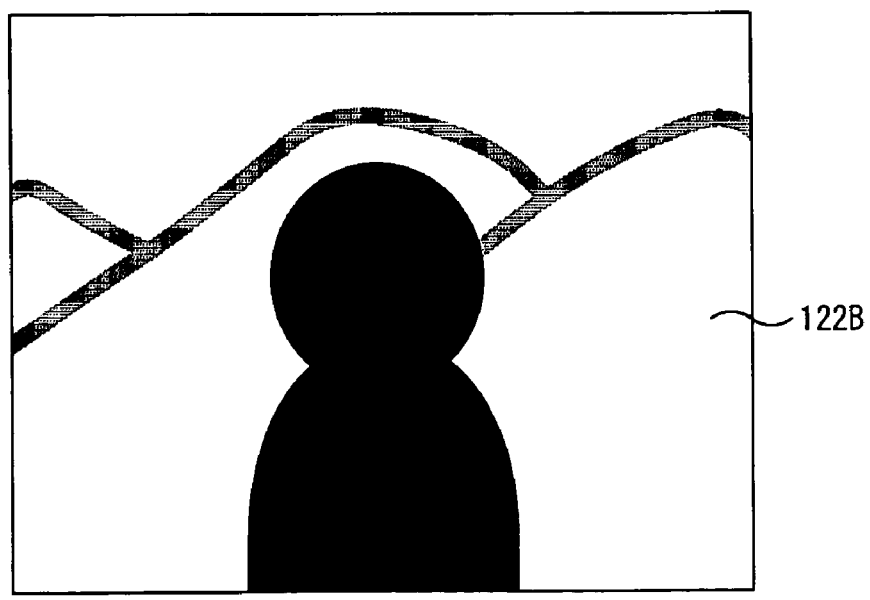
FIG. 9 illustrates an example of image corresponding to image data obtained by applying a filter process to the image of the background corresponding to the image shown in FIG. 8 by the filter processing section in the blurring effect generation processing section shown in FIG. 3.

More specifically, for example, the filter processing section (blurring section) 44 is supplied with the background data corresponding to the image 112 including the background region 122A as shown in FIG. 8. The filter processing section (blurring processing section) 44 applies a filter process providing the blurring effect to the background region image data so as to generate image data corresponding to the image 113 including the background region 122B to which the blurring effect is applied as shown in FIG. 9 and supplies it as blurred image for combining to the image combining section 45.

In this embodiment, a filter processes in the filter processing section (blurring processing section) 44, a plurality of kinds of processes are previously registered. A user can specify the kind of the filter process to be executed by the filter process section (blurring processing section) 44 by operating the filter selecting key 32. Further, the user can specify (set) various kinds of parameter values necessary for executing the specified kind of filter process by operating the filter selecting key 32.

More specifically, when the user specifies the kind of a predetermined filter process (kind) by operating a filter selection key 32, a signal (hereinafter referred to as a filter signal) indicating the kind and the value of the parameter, specified is applied to the filter processing section (blurring processing section) 44 through the main control section 21. Then, the filter processing section (blurring processing section) 44 executes the specified kind of filter processing using the specified parameter value on the basis of the filter signal.

As mentioned above, the user can set given values to various kinds of parameters necessary for the filter process executed by the filter processing section (blurring processing section) 44. Accordingly, the filter processing is readily provided with equivalent effect to the blurring effect (circle, polygon, or the like) provided with a large-diameter lens by the filter processing section (blurring processing section) 44.

Further, there are various kinds of filter processes to be executed by the filter processing section (blurring processing section) 44, and thus the user can specify the kind, so that in addition to the blurring effect with a large diameter lens, the user can easily make the filter processing section (blurring processing section) 44 execute the filter process having a blurring effect which cannot be provided by the general silver-chloride camera or the like.

The image combining section 45 combines the reference image data (the image data selected, by the selecting section 42, from the input image data with the stroboscopic light emission and the input image data without the stroboscopic light emission) with the blurred image for combining provided by the filter processing section (blurring processing section) 44 (in this case, the background region image data subject to the filter process) and supplies the resultant image (combined image data) to the main control section 21 as the output image data. In other words, the image combining section 45 executes the above-mentioned process (d).

Here, if the reference image data is simply combined with the blurred image data for combining, the combined image corresponding to the resultant combined image data has jagged portions on boundary between the object region and the background region (the boundary is jaggy). In other words, the combined image provides an unnatural feeling to the user.

Then, to generate a combined image (combined image data) providing a natural feeling, in this embodiment, the anti-aliasing processing section 46 is provided.

The anti-aliasing processing section 46 applies an anti-aliasing process to the binary-coded object extracted and image data supplied from the object detecting section 55 to supply the resultant image data to the image data combining section 45.

The image combining section 45 determines, with reference to the image data (binary-coded object extracted image data subject to the anti-aliasing process) supplied from the anti-aliasing processing section 46, pixel values of pixels arranged at the boundary between the corresponding object region and background region and its vicinity in the combined image data to be generated.

As mentioned above, the image data (the binary-coded object extracted image data subject to the anti-aliasing process) supplied to the image combining section 45 from the anti-aliasing processing section 46 is particularly used in the combining process at the boundary (edge) portion between the object region and the background region. Then, hereinafter, the image data (the binary-coded object extracted image data subject to the anti-aliasing process) supplied to the image combining section 45 from the anti-aliasing processing section 46 is referred to as edge process reference image data.

The anti-aliasing process itself is not particularly limited. For example, conventionally, methods of processing that a pixel value of a target pixel is converted to a middle value between the pixel value of the target pixel and the adjacent pixel can be used. However, in the present embodiment, to further reduce the unnatural feeling, an anti-aliasing process shown in FIGS. 10 and 11 is adopted. FIGS. 10A and 10B, and FIGS. 11A and 11B are graphical drawings illustrating the anti-aliasing process in the present embodiment.

FIG. 10A illustrates a region 93A neighboring to the boundary between the object region 91 and the background region 92 on the binary-coded object extracted image 91 in FIG. 6. FIG. 10B illustrates variation in pixel values (luminance values) in a spatial direction X in the region 93A. In this graphical illustration, it is assumed that the value indicating white (luminance value) is defined as 1 (actually, in the case of 256 gradations, 255) and the value indicating shadow (luminance value) is defined as 0. In other words, FIGS. 10A and 10B illustrate the condition before the anti-aliasing process of this embodiment is executed.

On the other hand, FIG. 11A illustrates luminance variation at the region 93B in the spatial direction X after anti-aliasing process, and FIG. 11B illustrates a curve of luminance variation at the region 93B in the same spatial direction X after anti-aliasing process. In the graph, as similar to FIG. 10B, the value indicating white (luminance value) is defined as 1 (actually, in the case of 256 gradations, 255) and the value indicating black (luminance) is defined as 0. FIGS. 11A and 11B show the condition after the anti-aliasing process of the present embodiment.

In comparison between FIGS. 10B and 11B, the curve indicating pixel values in FIG. 10B suddenly transients from 0 to 1 at the boundary and its vicinity. On the other hand, as shown in FIG. 11B, the curve after the anti-aliasing process transients smoothly from 0 to 1 around the boundary.

In other words, the anti-aliasing process of the present embodiment is a curve shown in FIG. 11B, i.e., a function outputting a value indicating a mixing ratio between the object region and the background region at inputted pixel position x, if the pixel position x in the spatial direction X is inputted as an input variable. Thus, the anti-aliasing process having a function f(x)=A outputs its output varying in the spatial direction X as shown in FIG. 11B, wherein each pixel value is determined using the output value A in the function f(x).

More specifically the anti-aliasing process of the present embodiment is a process that the pixel value at a pixel position x is converted into a value obtained by mixing the pixel value at the object region 91 (value 1 indicates white in the example in FIGS. 10A, 10B, 11A, and 11B) and the pixel value at the background region 92 (value 0 indicates shadow in the example in FIGS. 10A, 10B, 11A, and 11B) at a ratio of A:1−A.

Figure 12:
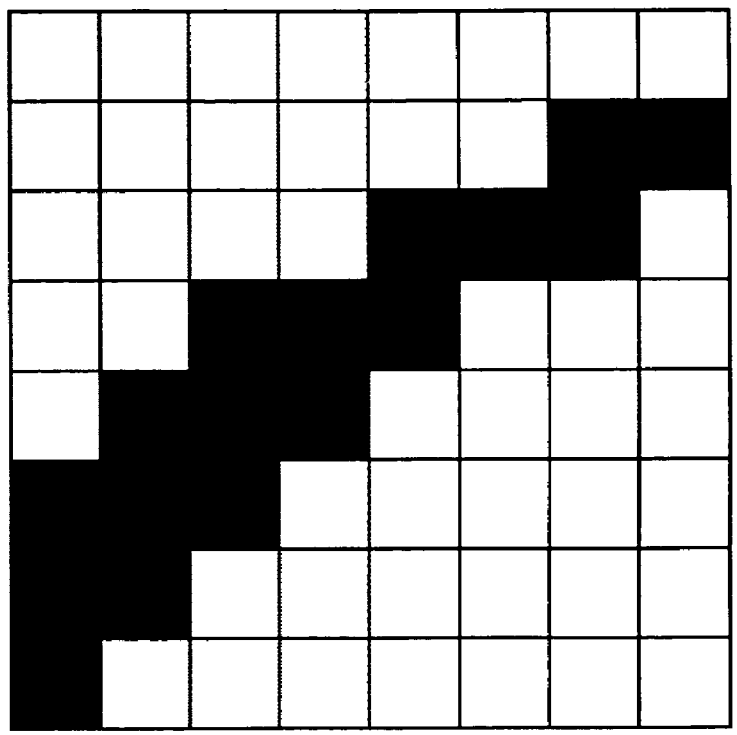
Figure 13:
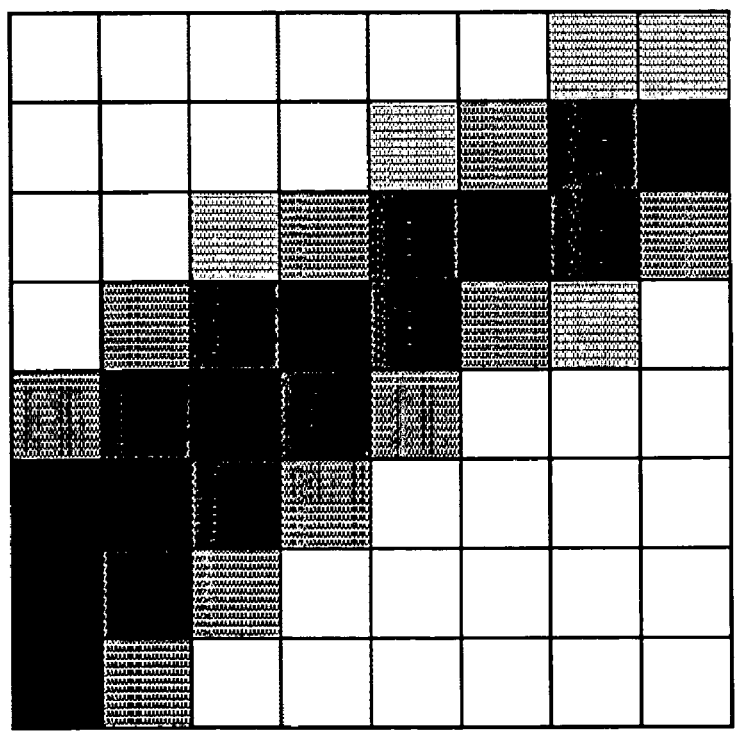

FIGS. 12 and 13 illustrate another processing result according to the present embodiment. More specifically, FIG. 12 illustrates a binary-coded image (prepared for a test) that is different from the above-mentioned image 81 shown in FIG. 6. FIG. 13 illustrates an image obtained by applying the anti-aliasing process according to the embodiment to the binary-coded image in FIG. 12 (more specifically, the image data corresponding to the binary-coded image).

Comparison of the image shown in FIG. 12 with that in FIG. 13 shows that the image in FIG. 12 has an edge that is explicitly jaggy. On the other hand, in the image in FIG. 13, the degree of jaggy of the edge is reduced.

Further, the function f(x) used while the anti-aliasing processing section 46 executes the anti-aliasing process is not limited to the function indicating the curve (or its approximate curve) shown in FIG. 11B, but simply a function having a curve smoothly varying can be used. More specifically, for example, Sigmoid curve (not shown) or the like can be used.

FIG. 14 illustrates the process that the reference image (its corresponding reference data) is, as mentioned above, combined with the background region image (its corresponding combining blurred image data) subject to the filter process with the blurring effect using the image (its corresponding edge reference image data) obtained by applying the anti-aliasing process of the present embodiment to the binary-coded object region extracted image 81 shown in FIG. 6 (binary-coded object region extracted image data corresponding to it). In other words, FIG. 14 illustrates the process in the image combining section 45 (FIG. 3).

In the example shown in FIG. 14, the input image data without the stroboscopic light emission corresponding to the image 72 in FIG. 5 is used as the reference image data, and the image data corresponding to the image 113 shown in FIG. 9 is used as the blurred image data for combining. The image 114 indicates an image obtained by applying the anti-aliasing process of the present embodiment to the binary-coded object region extraction image 81 in FIG. 6 (its corresponding binary-coded object region extracted image).

Further, the combined image obtained by the image combining section 45 that combines the image 72 (reference image data) with the image 113 (blurred image data for combining) with reference to the image 114 subject to the anti-aliasing process is shown as the image data 115.

To generate this combined image 115, the image combining section 45 executes the following process. The image combining section 45 obtains, on the basis of the pixel values of the pixels at the boundary and its vicinity between the object region and the background region in the image 114, a mixing ratio of each pixel value located between the object region and the background region at the corresponding portion (the boundary between the object region and the background region and its vicinity) of the combined image data to be generated and determines a pixel value of each pixel in accordance with the mixing ratio. More specifically, from the pixel value of the image 114, there is provided (calculated backward) the above-described A:1−A, which is the mixing ratio (composition ratio) of the pixel values at the object region and the background region. Then, each corresponding pixel value is successively determined such that each pixel located at the boundary (edge) between the object region and background region and its vicinity in the combined image 115 to be generated has a pixel value obtained by mixing pixel values at the object region and background region, respectively, at the mixing ration of A:1−A.

As mentioned above, the structure of the digital still camera 1 according to the present invention has been described.

Next, with reference to the flow chart shown in FIG. 15, will be described a sequential process (hereinafter referred to as shooting and recording process) in which upon depression of the shutter button 12 (FIGS. 1 and 2), the digital still camera 1 (FIGS. 1 and 2) according to the present embodiment shoots the object 2 (FIG. 1) to output encoded image data which is subjected to various kinds of image processes mentioned above and finally recorded as image data with the blurring effect in the image data (image data with the blurring effect) recording section 29 (FIG. 2).

First, in step S1, the main control section 21 of the digital still camera 1 in FIG. 2 judges whether the shutter button 12 is depressed.

If the shutter button 12 is not depressed, processing returns to step S1 to judge again whether the shutter button 12 is depressed. In other words the main control section 21 always monitors the depression of the shutter button 12.

For example, it is assumed that a user (not shown) depresses the shutter button 12 with the digital camera 1 (its shooting direction) being directed to the object 2 as shown in FIG. 1.

When receiving the signal from the shutter button 12, the main control section 21 judges that the shutter button 12 is depressed in step S1 and in step S2, controls the stroboscope control section 26 to change the amount of the stroboscopic light from the stroboscopic light emitting section 11. The main control section 21 controls the imaging section 25 to shoot the object 2 (shooting region including this) every once in a while the amount of the stroboscopic light is changed and encodes the resultant input image signal to supply the image data to the blurring generating section 28.

Hereinafter, the process in step S2 is referred to as shooting process. The process content of the shooting process in S2 is not particularly limited as long as the content is basically the content mentioned above.

However, here, for example, the process content is, as mentioned above, that the object 2 is shot in two different conditions, namely, the shooting condition with the stroboscopic light emission (first amount of light) and the shooting condition without the stroboscopic light emission (second amount of light). FIG. 16 illustrates a flow chart showing details of the shooting process having such a process content. The shooting process will be described in detail with reference to the flow chart shown in FIG. 16.

First, in step S11, under control of the main control section 21 the stroboscope control section 26 obtains a detected value (a brightness within the shooting region) of the photo sensor 27 and determines (detects) the amount of the stroboscopic light (necessary amount) based on the detected value to supply a signal indicating the determined result (in the above-described example, the stroboscopic light emission necessity detection signal shown in FIG. 3) to the main control section 21.

After that, in step S12, the imaging section 25 shoots the object 2 without the stroboscopic light emission under control of the main control section 21.

More specifically, for example, in the process in step S1 in FIG. 15, as mentioned above, after judging the depression of the shutter button 12, the main control section 21 starts inputting the image signal of the object 2 shot by the imaging section 25. In the process in step S11, the main control section 21 obtains the image signal supplied from the imaging section 25 just after receiving the signal from the stroboscope control section 26 (or after a predetermined interval elapsed after that), namely, the image signal supplied from the imaging section 25 when the stroboscopic light emitting section 11 does not emit light as the image signal of the object 2 shot without the stroboscopic light emission (shot only under natural light) and encodes and supplies it to the blurring effect generation processing section 28.

As mentioned above, the image data supplied from the main control section 21 to the blurring effect generation processing section 28 in step S12 becomes the input image data without the stroboscopic light emission depicted in FIG. 3.

After the process in step S12, the imaging section 25 shoots, in step S13, the object 2 with the stroboscopic light emission on the basis of the control of the main control section 21.

More specifically, for example, the main control section 21 continuously obtains the image signal of the object 2 shot by the imaging section 25 also after the process in step S12, and controls the stroboscope control section 26 just after the process in step S12 or when a predetermined interval elapsed after the process in step S12, and the main control section 21 controls the stroboscope control section 26 to cause the stroboscopic light emitting section 11 to emit light with an amount of light (with the above described first amount) detected in the process in step S11. The main control section 21 obtains the image signal supplied from the imaging section 25 at this timing as the image signal of the object 2 shot with the stroboscopic light and encodes it to supply it to the blurring effect generation processing section 28.

As described above, the image data supplied from the main control section 21 to the blurring effect generation processing section 28 in step S13 is the input image data with the stroboscopic light emission as illustrated in FIG. 3.

In summary, in the imaging process of the present embodiment, the image data of the object 2 shot under two shooting conditions, i.e., the presence and the absence of the stroboscopic light emission provided in response to the once depression operation of the shutter button 12, namely, the input image data with the stroboscopic light emission and the image data without the stroboscopic light emission are generated by the main control section 21 and supplied to the blurring effect generation processing section 28.

Further, the processing timings of the steps S12 and S13 are not specially limited, and thus, the process in step S13 may be executed previously.

Here, as mentioned above, a difference between a pair of pixels at corresponding arrangement positions between the image (image data) of the object 2 shot in the process in step S12 and the image (image data) of the object 2 shot in the process in step S13, is calculated (difference image data is generated), and on the basis of the difference value in luminance, the object region or the background region other than the object region is detected. To detect the object region accurately, as mentioned above, it is desirable that corresponding arrangement positions of the object (object 2 or the like) agree with each other between the image (image data) of the object 2 shot in the process in step S12 and the image (image data) of the object 2 shot in the process in step S13. More specifically, it is preferable that the object within the shooting region of the digital camera 1 does not move in the actual space. Thus, it is preferable that the interval of the processes in steps S12 and S13 is as short as possible.

Returning to FIG. 15, when the shooting process in step S2 finishes, and the input image data with the stroboscopic light emission and the input image data without the stroboscopic light emission are supplied to the blurring effect generation processing section 28, the blurring effect generation processing section 28 executes the processes (b), (c), and (d) in steps S3 and S4.

Out of the processes (b), (c), and (d), the processes executed by the region extracting section 41 in FIG. 3 (except the separating section 56) and the anti-aliasing processing section 46 corresponds to, in the example shown in FIG. 15, the process in step S3. Hereinafter, the process in step S3 is referred to as object extraction process.

Further, out of the processes (b), (c), and (d), the processes executed by the separating section 56, the selecting section 42, the selecting section 43, the filter processing section (blurring processing section) 44, and the image combining section 45 correspond to the process in step S4. Hereinafter, the process in step 54 is referred to as image combining process.

Figure 17:
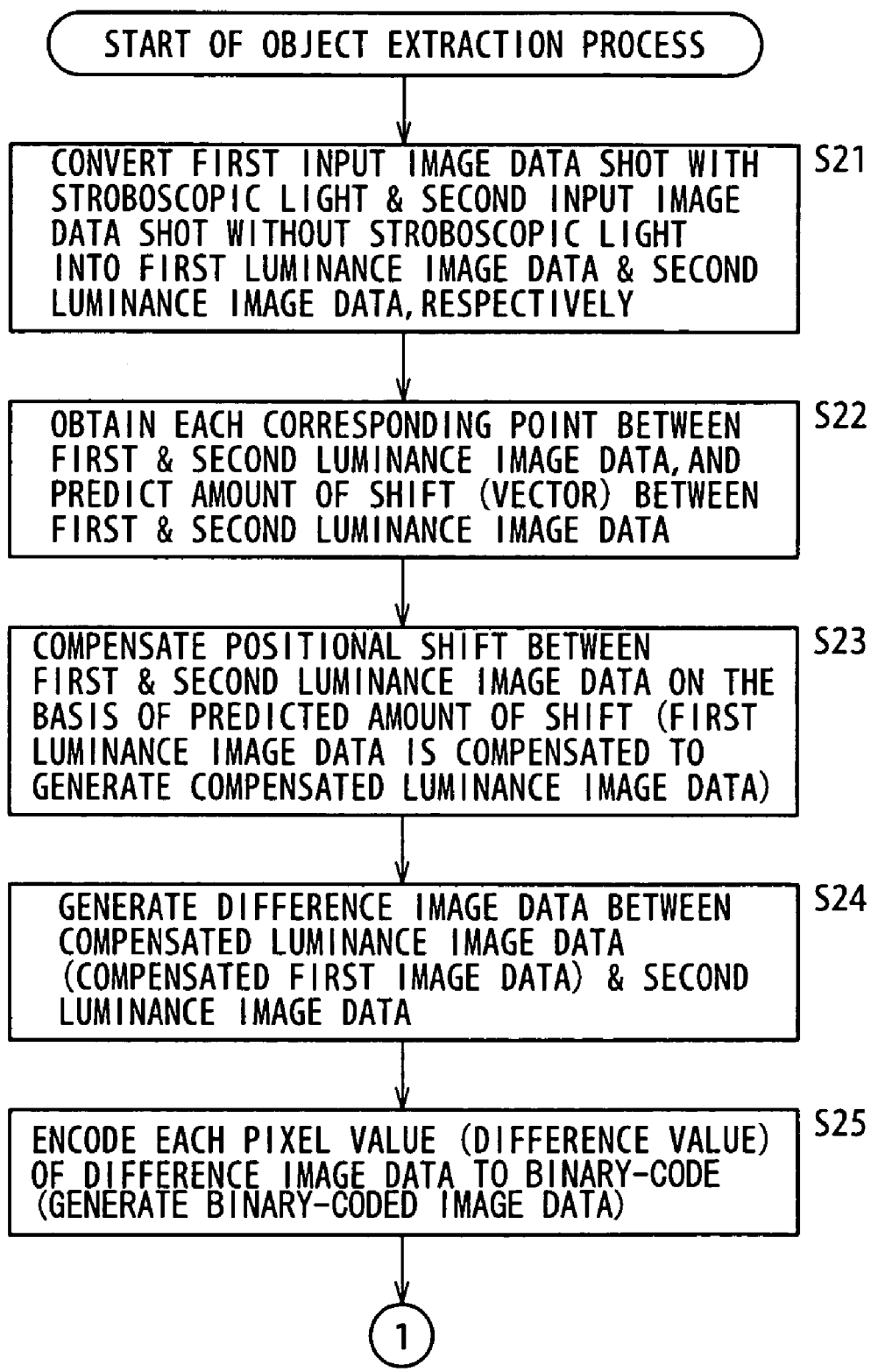
FIG. 17 depicts a detailed flow chart describing an example of an object extracting process executed shown in FIG. 15.
Figure 18:
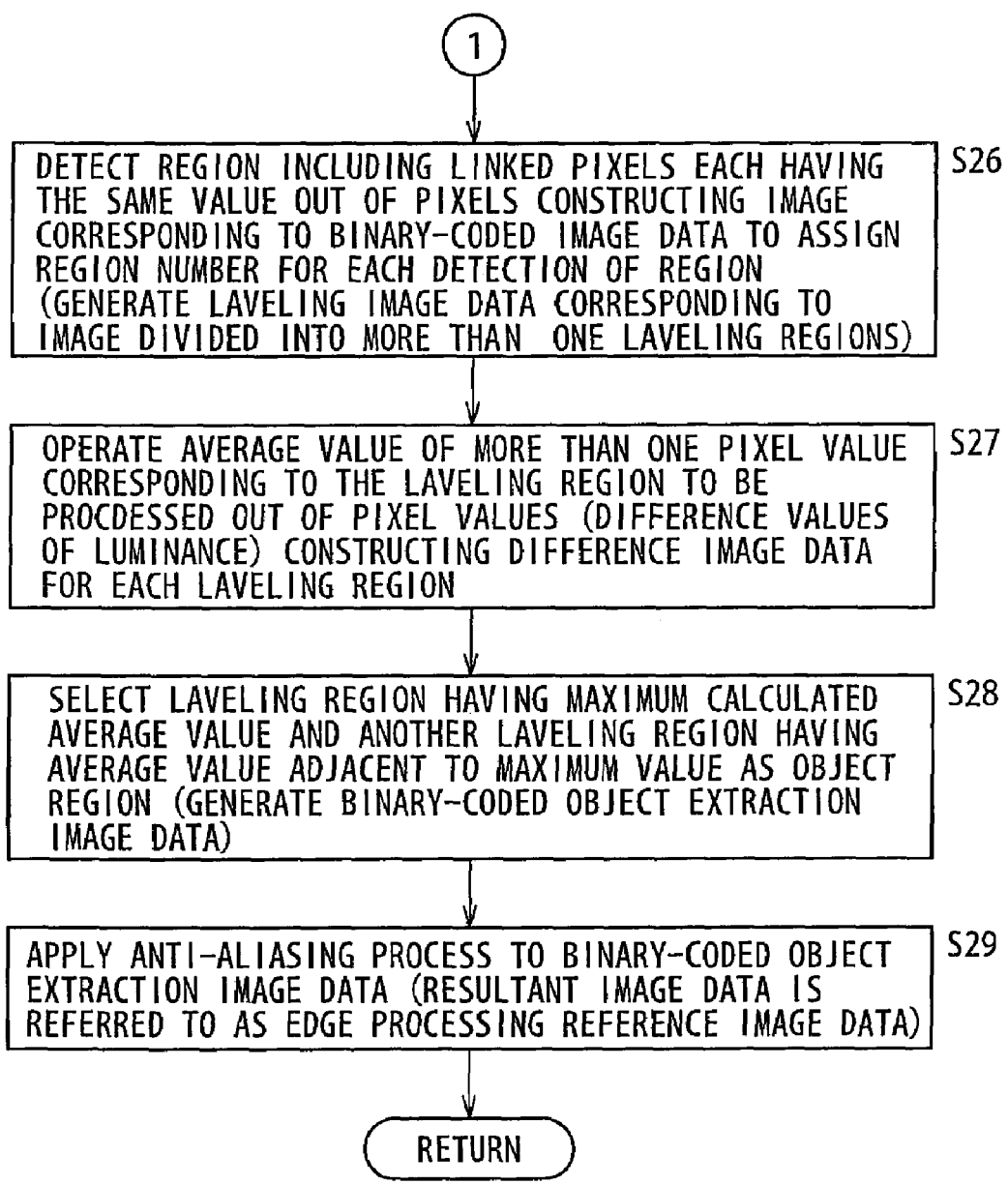
FIG. 18 depicts a detailed flow chart describing an example of an object extracting process in the imaging and recording process shown in FIG. 15.

FIGS. 17 and 18 illustrate flow charts describing an example of object extraction process in detail. FIG. 19 illustrates a flow chart describing an example of image combining process. First, with reference to FIGS. 17 and 18, the example of the object extraction process will be described. Second, with reference to the flow chart shown in FIG. 19, the example of the image combining process will be described.

In the object extraction process in FIG. 17 (the process in step S3 in FIG. 15), as described above, first, the luminance image converting section 51 in the region extracting section 41 in FIG. 3 converts, in step S21, the first input image data shot with the stroboscopic light emission and the second input image data shot without the stroboscopic light emission into the first luminance image data with the stroboscopic light emission and the second luminance image data without the stroboscopic light emission, respectively.

When the first luminance image data with the stroboscopic light emission and the second luminance image data without the stroboscopic light emission is supplied to the position shift compensating section 52, in step S22, the position shift compensating section 52, as described above, obtains a pair of corresponding points between the first luminance image data with the stroboscopic light emission and the second luminance image data without the stroboscopic light emission and predicts an amount of shift (vector) between the first luminance image data with the stroboscopic light emission and the second luminance image data without the stroboscopic light emission on the basis of the positional relation of these corresponding points.

In step S23, as described above, the position shift compensating section 52 compensates the position shift between the first luminance image data with the stroboscopic light emission and the second luminance image data without the stroboscopic light emission on the basis of the amount of shift (vector) predicted in the process in step S22. More specifically, the position shift compensating section 52 compensates the first luminance image data with the stroboscopic light emission by compensating an arrangement position of each pixel constructing corresponding luminance image to generate compensated luminance image data with the stroboscopic light emission supplied to the adding section (difference value calculating section) 53.

As described above, when the compensated luminance image data with the stroboscopic light emission is supplied to the adding section (difference value calculating section) 53 (the second luminance image data without the stroboscopic light emission has been supplied thereto after the process in step S21 from the luminance image converting section 51), and the adding section (difference value calculating section) 53, as described above, generates the difference image data between the compensated luminance image data (the compensated first luminance image data with the stroboscopic light emission and the second luminance image data without the stroboscopic light emission to supply it to the binary-coding section 54 and the object detecting section 55.

Then, in step S25, the binary-coding section 54, as described above, encodes each pixel value of the difference image data (difference value of the luminance value) to a binary-code to generate the binary-coded image data supplied to the object detecting section 55.

After that, the processing proceeds to step S26 in FIG. 18.

In step S26, the object detecting section 55 detects a region including pixels having the same value (either of two values such as the first or the second value mentioned above) and linked each other out of the pixels constructing the image corresponding to the binary-coded image data supplied from the binary-coding section 54 in the process in step S25 (FIG. 17) and assigns a region number to the detected region every once in a while the region is detected. Hereinafter, the region with the region number is referred to as a labeling region.

A method of assigning the region numbers is not specifically limited, but here the following method is used. The object detecting section 55 converts all pixel values included in each labeling region into the region number. In other words, the method is such that image data (hereinafter referred to as labeling image data) corresponding to images divided into more than one labeling regions, namely, labeling image data having a labeling number as each pixel value are generated.

Next, in step S27, the object detecting section 55 calculates for each labeling region an average value of more than one pixel value (difference value of luminance) corresponding to the labeling region to be processed out of the pixel values (difference values of luminance) constructing the difference image data supplied in the process in step S24 in FIG. 17.

As mentioned above, all pixel values corresponding to the object region (difference value in luminance) must be large, on the other hand, all pixel values corresponding to the background region must be small.

Then, in step S28, the object detecting section 55 selects the labeling region having a maximum calculated average value (average value of difference values in luminance value) and another labeling region having an average close to the maximum calculated average value as the object region. After that, the object detecting section 55 converts all pixel values corresponding to the labeling region detected as the object region out of the pixel values constructing the labeling image data into a value, for example, a value indicative of white, and all pixel values corresponding to the labeling region other than it, namely the labeling region detected as the background region, into a second value (for example, a value indicating black) to supply the resultant binary-coded image data to the separating section 56 and the anti-aliasing section 46 as the binary-coded object image data.

More specifically, in step S28, the object detecting section 55 produces, as mentioned above, the binary-coded object extracted image data to supply it to the separating section 56 and the anti-aliasing section 46.

In step S29, the anti-aliasing processing section 46 applies, as described above, the anti-aliasing process to the binary-coded image extracted data and supplies the resultant image data to the image combining section 45 as edge process reference image data.

This terminates the process of object extraction process (step S3 in FIG. 15) in this example, and the process of image combining process (step S4 in FIG. 15) is successively executed.

Here, with reference to FIG. 19, the image combining process will be described in details.

First, in step S41, the selecting section 42 in FIG. 3 determines which data is reference image data for combining between the input image data with the stroboscopic light emission and the input image data without the stroboscopic light emission supplied from the main control section 21 in shooting process (the process in step S2 in FIG. 15 and a detailed example is shown in FIG. 16) on the basis of control by the main control section 21.

Figure 20:
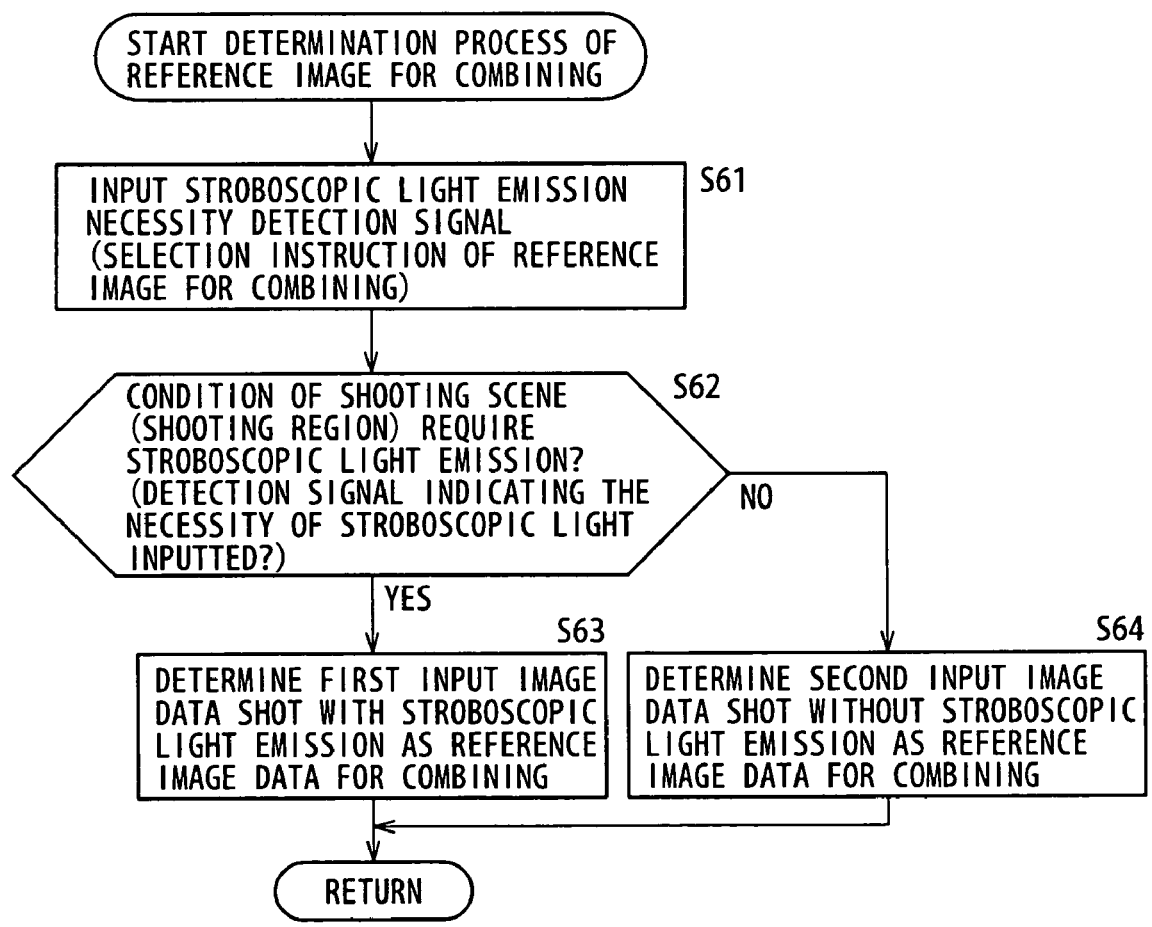
FIG. 20 depicts a detailed flow chart describing an example of a reference image data determining process for combining in the imaging combining process shown in FIG. 19.

Hereinafter, the process in step S41 like this is referred to as the reference image data determination process for combining. FIG. 20 illustrates a flow chart describing an example of the reference image data determination process for combining in detail. Hereinafter, with reference to the flow chart shown in FIG. 20, the example of the reference image data determination process for combining will be described in detail.

First, in step S61, the selecting section 42 inputs, as described above, the stroboscopic light emission necessity detection signal (reference image selecting instruction for combining) from the main control section 21.

In step S62, the selecting section 42 judges whether the condition of the shooting scene (shooting region) at the shooting timing did or did not require the stroboscopic light emission on the basis of the stroboscopic light emission necessity detection signal (reference image selecting instruction for combining) inputted in the process in step S61.

More specifically, if a detection signal indicating the necessity of the stroboscopic light emission is inputted as the stroboscopic light emission necessity detection signal (reference image selecting instruction for combining), in step S62, the condition of the shooting scene is judged as a condition requiring the stroboscopic light emission. In step S63, the first input image data shot with the stroboscopic light emission is determined as the reference image data for combining and supplied to the separating section 56 and the image combining section 45. Then, the reference image data determination process is terminated.

On the other hand, if a detection signal indicating the unnecessity of the stroboscopic light emission is inputted as the stroboscopic light emission necessity detection signal (reference image selection instruction for combining), the condition of the shooting scene is judged, in step S62, as a condition requiring no stroboscopic light emission (unnecessary condition of the stroboscopic). Then, in step S64, the second input image data shot without the stroboscopic light emission is determined as the reference image data for combining which is supplied to the separating section 56 and the image combining section 45. This terminates the combining reference image data determination process.

Returning to FIG. 19, when the reference image data determined (selected) by the combining reference image determination process in step S41 is supplied to the separating section 56, in a step S42, the separating section 56 separates, on the basis of the binary-coded object extracted image data supplied from the object extracting section 55 in the process in step S28 (FIG. 18), the reference image data for combining into the background region image data and the object region image data which are supplied to the selecting section 43.

In a step S43, the selecting section 43 judges whether the region to be blurred is or is not the background region.

More specifically, as mentioned above, in this embodiment, when the logic level of the signal inputted from the main control section 21 as the combining blurred image selection instruction is low, the signal indicates an instruction selecting the background region image data. On the other hand, when the level is high, the signal indicates an instruction for selecting the object region image data.

Then, when the signal of the low level is inputted from the main control section 21 as the combining blurred image selection instruction, the selecting section 43 judges, in a step S43, that the blurring region is the background region to supply the background region image data to the filter processing section (blurring processing section) 44.

Then, the filter processing section (blurring processing section) 44 applies, in step S44, the filter process (blurring process) to the background region image data to determine the resultant image data as the blurred image data for combining that is supplied to the image combining section 45.

When a signal of a logic high level is inputted as the blurred image selection instruction for combining from the main control section 21, the selecting section 43 judges, in step S43, that the region to be blurred is the object region data (not the background region) and supplies to the filter processing section (blurring effect generation processing section) 44 the object region image data out of the background region image data and the object region image data supplied from the separating section 56.

Then, in step S45, the filter processing section (blurring effect generation processing section) 44 applies the filter processing (blurring effect process) to the object region image data and determines the resultant image data as the blurred image data for combining that is supplied to the image combining section 45.

When the combining blurred image data is supplied from the filter processing section (blurring effect generation processing section) 44 to the image combining section 45 as the result of the process in step S44 or step S45 (the reference image data and the edge process reference image data are supplied to the image combining section 45 after the step S41 and after step S29 in FIG. 18, respectively), processing proceeds to step S46.

More specifically, in a step S46, the image combining section 45 generates the combined image data of the reference image data (for combining) and the blurred image data for combining with reference to the edge process reference image data (the binary-coded object extracted image data subject to the anti-aliasing process) and supplies it to the main control section 21 as output image data. This terminates the image combining process.

Returning to FIG. 15, when the combined image data (the image data corresponding to the image of the object 2 with the blurring effect) is supplied to the main control section 21, as the result of the image combining process in step S4, the main control section 21 stores, in step S5, the combined image data in the image recording section 29 and/or the removable recording medium 31 through the drive 30, in FIG. 2. In this operation, as mentioned above, the combined image data may be compressed (encoded) by compression-coding method such as JPEG format to be stored in the image storing section 29 or the removable recording medium 31.

This terminates the shooting and recording processing for the digital still camera 1.

As the digital still camera 1 can execute the shooting and recording process as described above, namely, can execute the processes from (a) to (d), without the special conditions (limitation) such as (the above-described) (1) and (2) explained in Description of the Related Art, the digital still camera 1 can readily generate and provide the image with the blurring effect (the image data corresponding to it) to the user by only executing the digital image processing which is inherently provided to the digital still camera 1.

Further, the main control section 21 is capable of controlling respective sections of the digital still camera 1 to automatically execute the above-described shooting and recording process when a trigger signal with that the signal from the shutter button 12 is regarded as the start of processes (a) to (d) is generated.

Furthermore, the automatically executed process used herein means a process executed by its own judgment (or under control of the other unit) without intervention of user's manual operation.

More specifically, upon depression of the shutter button 12, the main control section 21 causes the stroboscope control section 26 to execute the process and obtains more than one pieces of images of the object 2 shot by the imaging section 25 at every change of the amount of light from the stroboscopic light emitting section 11 under control of the stroboscope control section 26 to encode the obtained image. After that, the main control section 21 can control to execute the processes for the encoded more than one piece of image data in the blurring effect generation processing section 28 as a sequential processing in the order as mentioned above.

Thus, for the user, only such a simple user's operation that the shutter button 12 is depressed once easily provides the image with the blurring effect (the image data corresponding to it).

As mentioned above, the digital still camera 1 according to the present embodiment can resolve the conventional problems.

In other words, as long as an image processing apparatus capable of executing the processes (a) to (d), i.e., if it has the control function of the stroboscopic light emission unit (illumination unit), the control function (of obtaining the image signals) of the imaging unit, and the digital signal processing function to the image signal at least, it can provide the same advantageous effect as the digital still camera 1. In other words, the present invention is applicable to such an image processing apparatus.

For example, the present invention is applicable to, as an image processing apparatus, portable mobile information terminals (not shown) with camera functions of which demands have been increased. Furthermore, the present invention is also applicable to the personal computer shown in FIG. 21.

In FIG. 21, the CPU 201 executes various processes in accordance with the program stored in the ROM 202, or loaded in the RAM 203 from the storing section 208.

Further, data necessary for executing the various processes by the CPU 201 is occasionally stored in the RAM 203.

The CPU 201, the ROM 202, and the RAM 203 are connected to each other through a bus 204. The bus 204 is further connected to an input/output interface 205.

The input/output interface 205 is connected to a storing section 208, an input section 206 including a keyboard, a mouse, and the like, an output section 207 including a display, a storing section 208 including a hard disk drive, a communicating section 209 for executing a communication process with other apparatuses (not shown) through a network (not shown) including the Internet.

The input/output interface 205 is further connected to the imaging section 210 and the stroboscope control section 211. The stroboscope control section 211 is connected to a stroboscopic light emitting section 212 and the photo sensor 213. The imaging section 210, the stroboscope control section 211, the stroboscopic light emitting section 212, and the photo sensor 213 are not specifically limited to specific modes as long as they have basically the same functions. Further, the imaging section 210 and the stroboscopic light emission section are not essential elements (it is unnecessary to be built in) and thus, any external attachable unit can be used.

The input/output interface 205 may be further connected to a drive 214 at need in which a removable recording medium 215 such as a magnetic disk, an optical disk, a magneto-optical disk, or semiconductor memory is occasionally loaded to install a computer program read therefrom in the storing section 208.

Here, if the above-mentioned sequential process (for example, the processes (a) to (d) mentioned above) is executed by software, the program constructing the software is installed via the network or the recording mediums.

The recording medium may comprise, as shown in FIG. 2 or FIG. 21, not only a magnetic disk (including a floppy disk), an optical disk (including CD ROM (Compact Disk Read Only Memory) and DVD (Digital Versatile Disk)), or a package media comprising a semiconductor memory (a removable recording medium 31 shown in FIG. 2, or the removable recording medium 215 shown in FIG. 21), which are distributed separately from the body of the apparatus but also a ROM 22 in FIG. 2, or the ROM 202 in FIG. 21, or a hard disk or the like included in the image recording section 29 in FIG. 2, or the storing section 208 in FIG. 21.

Further, in this specification, there may be various manners in which the steps describing the program to be recorded in a recording medium are processed, namely, the steps are executed sequentially in order of the description, independently, or in parallel.

Further, the term "system" means, in this specification, the whole of the apparatus constructed with a plurality of units or processing sections.

What is claimed is:

1. An image processing apparatus for processing image data of an object shot by an imaging unit and encoded, comprising:
   illumination controlling means for controlling emission of light to the object with a setting amount of light from the illumination unit when shooting the object by the imaging unit;
   region extracting means for independently extracting the image data of an object region indicating the object, and image data of a background region indicating a background other than the object from reference image data out of two pieces of image data based on more than one piece of image data, respectively shot by the imaging unit and encoded at each change in an amount of the light from the illumination unit under control by the illumination controlling means;
   filter processing means for applying a filtering process with the blurring effect to at least one piece of the image data of the object region and the image data of the background region, both extracted by the region extracting means; and
   combining means for generating combined image data of the reference image data with the image data subject to the filtering processing by the filter processing means out of the image data of the object region and the image data of the background region.

2. The image processing apparatus as cited in claim 1, wherein
   the illumination control means sets either a first amount of light or a second amount of light as the amount of light of the illumination device, and wherein the image processing apparatus further comprises:
   selection means for selecting the reference image data from a first image data of the object when shot by the imaging unit while the illumination device emits the first amount of light, and a second image data of the object when shot by the imaging unit while the illumination unit emits the second amount of light, wherein
   the region extracting means extracts the image data of the object region and the image data of the background region from the reference image data selected by the selection means based on a mutual relation between illumination of each pixel constructing the image corresponding to the first image data, and illumination of each pixel constructing the image corresponding to the second image data.

3. The image processing apparatus as cited in claim 2, wherein
   the illumination control means sets an amount of light satisfying a condition that the object exists within an illumination region of the illumination unit as the first amount of light, and sets an amount of light which is zero as the second amount of light.

4. The image processing apparatus as cited in claim 2, wherein the region extracting means comprises;
   difference value calculating means for calculating a difference value between each pair of the pixel values constructing the first image data and a pixel value of the second image data at corresponding pixel positions out of the pixel values of the first image data and the pixel values of the second image data; and
   separating means for separating the reference image data selected by the selection means into the image data of the object region and the image data of the background region for extraction.

5. The image processing apparatus as cited in claim 4, wherein
   the region extracting means further comprises:
   compensation means for obtaining pixels from pixels constructing the image corresponding to the second image data which are corresponding points to at least a part of pixels constructing the image corresponding to the first image data and compensating pixel positions of the image corresponding to the first image data based on each positional relation between obtained corresponding points, wherein
   the difference value calculating means calculates difference values between pixel values at corresponding pixel positions out of pixel values of each pixel constructing the first image data compensated by the compensation means and pixel values of constructing the second image data, respectively.

6. The image processing apparatus as cited in claim 4, wherein
   the difference value calculating means outputs difference image data having the calculated difference value as each pixel value;
   the region extracting means further comprises:

binary-coding means for binary-coding each pixel value of the difference image data outputted from the difference value calculating means and outputting the resulting first binary-coded image data; and object detecting means for detecting the object region from an image corresponding to the first binary-coded image data outputted by the binary-coding means on the basis of the difference image data outputted by the difference value calculating means and generating a second binary-coded image data having a first value for pixel values of pixels constructing the detected object region and a second value for pixel values of pixels constructing the background region other than the object region, wherein the separating means separates the reference image data into the image data of the object region and image data of the background region for extraction on the basis of the second binary-coded image data outputted by the object region detection means.

7. The image processing apparatus as cited in claim 6, further comprising:

anti-aliasing processing means for effecting anti-aliasing processing to the second binary-coded data outputted by the object detection means, wherein the combining means determines a pixel value of each pixel at a boundary between the corresponding images of the object region and the background region and at the vicinity of the boundary in the combining image data based on the second binary-coded image data subject to the anti-aliasing process by the anti-aliasing processing means.

8. The image processing apparatus as cited in claim 7, wherein the anti-aliasing processing means for executing an anti-aliasing processing using a function supplied with pixel positions in a predetermined direction as an input variable for outputting values indicative of a mixing ratio between the object region and the background region at a pixel of pixel positions in which the output shows a change of a curve along an advance direction.

9. The image processing apparatus as cited in claim 1, further comprising:

specifying means for specifying a kind to be used among a plurality of kinds of processes previously registered as a filter processing in the filter processing means and a value of parameter necessary for the specified kind of the filtering process, wherein the filter processing means can execute a filter process specified by the specifying process means with the specified value of the parameter.

10. The image processing apparatus as cited in claim 1, further comprising:

trigger generating means for generating a trigger causing the imaging unit to shoot the object; and process control means for causing the illumination controlling means to execute its process in response to the trigger generated by the trigger generating means, obtaining more than one image of the object shot by the imaging unit every change in an amount of light of the illumination unit under controlling of the illumination control means to encode them, and causing the region extracting means, the filter processing means, and a combining means to execute their processes in this order as a sequential process.

11. An image processing method of processing image data of an object shot by an imaging unit and encoded, comprising:

an illumination controlling step for setting an amount of light from an illumination unit and controlling emission of light to an object with the setting amount of light from the illumination unit on shooting the object by the imaging unit;

a region extracting step for independently extracting image data of an object region indicating the object and image data of a background region indicating a background other than the object from reference image data for reference out of more than one pieces of image data on the basis of more than one piece of image data, respectively shot by the imaging unit at each change in an amount of the light from the illumination unit under control by the illumination controlling step;

a filter processing step for applying a filter processing with a blurring effect to at least one of a piece of the image data of the object region and a piece of image data of the background region, extracted by the region extracting step; and a combining step for generating combined image data of the reference image data with the image data subject to the filter process by the filter processing step out of the image data of the object region and the image data of the background region.

12. A computer-readable medium storing a computer program that, when executed on a computer, causes the computer to perform a method to control image processing for image data of an object shot by an imaging unit and encoded, the method comprising:

an illumination controlling step for setting an amount of light from an illumination unit and controlling emission of light to an object with the setting amount of light from the illumination unit when shooting the object by the imaging unit;

a region extracting step for independently extracting image data of an object region indicating the object and image data of a background region indicating a background other than the object from reference image data for reference out of more than one pieces of image data based on more than one piece of image data, respectively shot by the imaging unit at each change in an amount of the light from the illumination unit under the control by the illumination controlling step;

a filter processing step for applying a filter processing with a blurring effect to at least one of a piece of the image data of the object region and a piece of image data of the background region, extracted by the region extracting step; and a combining step for generating combined image data of the reference image data with the image data subject to the filter process by the filter processing step out of the image data of the object region and the image data of the background region.

* * * * *